US008266200B2

(12) United States Patent
Iguchi et al.

(10) Patent No.: US 8,266,200 B2
(45) Date of Patent: Sep. 11, 2012

(54) APPLICATION INTERACTION SYSTEM, APPLICATION INTERACTION METHOD, RECORDING MEDIUM, AND APPLICATION INTERACTION PROGRAM

(75) Inventors: Keiichi Iguchi, Tokyo (JP); Kazuya Koyama, Tokyo (JP)

(73) Assignee: NEC Corporation, Tokyo (JP)

( * ) Notice: Subject to any disclaimer, the term of this patent is extended or adjusted under 35 U.S.C. 154(b) by 580 days.

(21) Appl. No.: 12/515,906

(22) PCT Filed: Oct. 25, 2007

(86) PCT No.: PCT/JP2007/070793
§ 371 (c)(1),
(2), (4) Date: May 21, 2009

(87) PCT Pub. No.: WO2008/065835
PCT Pub. Date: Jun. 5, 2008

(65) Prior Publication Data
US 2009/0328068 A1 Dec. 31, 2009

(30) Foreign Application Priority Data
Nov. 29, 2006 (JP) ................. 2006-321823

(51) Int. Cl.
G06F 15/16 (2006.01)
(52) U.S. Cl. ........................ 709/201; 715/222
(58) Field of Classification Search .................. 709/229
See application file for complete search history.

(56) References Cited

FOREIGN PATENT DOCUMENTS

| JP | 1994131153 A | 5/1994 |
|---|---|---|
| JP | 1999143724 A | 5/1999 |
| JP | 2003303103 A | 10/2003 |
| JP | 2004341999 A | 12/2004 |
| JP | 2005267194 A | 9/2005 |
| JP | 2005285009 A | 10/2005 |
| JP | 2006004111 A | 1/2006 |
| JP | 2006085407 A | 3/2006 |
| JP | 2006190008 A | 7/2006 |
| WO | 2004068407 A | 8/2004 |

OTHER PUBLICATIONS

International Search Report for PCT/JP2007/070793 mailed Dec. 25, 2007.
"JSR-000154 Java Servlet 2.4 Specification", [online], Java Community Process, [searched Nov. 15, 2006], Internet, <URL: http://jcp.org/aboutJava/communityprocess/final/jsr154/index.html >.
"XML path Language (XPath) Version 1.0", [online], W3C Recommendation Nov. 16, 1999, [searched Nov. 15, 2006], Internet, <URL : http://www.w3.org/TR/xpath>.
"XAML Overview", [online], Microsoft, [searched Nov. 15, 2006], Internet, <URL : http://windowssdk.msdn.microsoft.com/en-us/library/ms752059.aspx>.
"Microsoft COM Technology", [online], Microsoft, [searched Nov. 15, 2006], Internet, <URL : http://www.microsoft.com/japan/com/compapers.asp>.

(Continued)

Primary Examiner — Hua Fan

(57) ABSTRACT

An application interaction system includes: means (136) for storing extraction rules; means (141) for storing conversion rules; means (132) for selecting an extraction rule in means (136); means (133) for extracting data from a first application according to the selected extraction rule; means (134) for selecting a conversion rule in means (141); and means (131), according to the selected conversion rule, for supplying data extracted by means (133) to paste to a second application; and further, means (112) for presenting the selected extraction rule to the first application and supplying the extraction rule after alteration according to data alteration instructions specified in the presented extraction rule, and/or means (122) for supplying information indicating the alteration content according to the data alteration instructions supplied by means (131).

25 Claims, 14 Drawing Sheets

OTHER PUBLICATIONS

"CORBA/IIOP Specification", [online], Object Management Group, [searched Nov. 15, 2006], Internet <URL : http://www.omg.org/technology/documents/formal/corba_iiop.htm>.

"CORBA Overview", Common Object Broker Architecture (CORBA), v3.0 Jul. 2002, p. 2-1-2-18.

"Dr. GUI Online", Microsoft, 2006, Internet, <URL: http://msdn.microsoft.com/ja-jp/library/cc482719.aspx>.

Fig.2

| extraction rule table 137 ||
|---|---|
| extraction-source identifiers 140-1 | extraction rules 138 |
| AAA | extraction rule 1 |
| BBB | extraction rule 2 |
| CCC | extraction rule 3 |

Fig.3

| extraction information 140 ||
|---|---|
| extraction-source identifiers 140-1 ||
| extraction-source information 140-2 ||
| extraction item 1 | 140-3 |
| : | |
| extraction item n | |

Fig.4

| conversion rule table 142 | | | |
|---|---|---|---|
| extraction-source identifiers 140-1 | paste-destination identifiers 148 | paste-destination structure information 142-3 | conversion rules 143 |
| AAA | XXX | <from><a type=... | conversion rule 1 |
| BBB | YYY | <from><b type=... | conversion rule 2 |
| CCC | ZZZ | <from><c type=... | conversion rule 3 |

APPLICATION INTERACTION SYSTEM, APPLICATION INTERACTION METHOD, RECORDING MEDIUM, AND APPLICATION INTERACTION PROGRAM

This application is the National Phase of PCT/JP2007/070793, filed Oct. 25, 2007, which is based upon and claims the benefit of priority from Japanese Patent Application No. 2006-321823, filed on Nov. 29, 2006, the disclosure of which is incorporated herein in its entirety by reference.

TECHNICAL FIELD

The present invention relates to an application interaction system, an amplification circuit server, an extraction-side interaction device, paste-side interaction device, an application interaction proxy server, an application interaction method, a recording medium, and an application interaction program in which interaction rules are acquired by a user's operations.

BACKGROUND ART

When an operation is carried out by a business application, processing is carried out while exchanging data among a plurality of applications (hereinbelow, represented as "AP"). If APs are designed in advance on the premise that they will work together in such cases, a multiplicity of already-existing dedicated interaction technology (such as CORBA (see Non-Patent Document 1) or SOAP and COM (see Non-Patent Document 2)) can be used to enable exchange of data between the APs. These methods (the dedicated interaction technology) can be used, for example, when the search result of a Web AP that searches for information and displays the result is scheduled for input to a separate document-input AP and the information-search Web AP provides a Web service interface that uses, for example, SOAP, and moreover, the document-input AP corresponds to this Web service.

On the other hand, demand often arises for data exchange with other APs that was not anticipated at the time of designing an AP. For example, when a Web AP in the above-described case does not offer interaction means or, even if interaction means is offered, the above-described document-input AP is not compatible with this interaction means, the user must manually move values for each item. Such procedures entail not only time and trouble, but the procedures are also difficult to explain to other workers.

Patent Document 1 describes a technique for carrying out batch data exchange between APs without rebuilding an already existing AP. The AP interaction system disclosed in Patent Document 1 includes: an interaction information collection unit, a data converter, a communication unit, a configuration DB, a data output unit, and a system-setting program. The AP interaction system having this configuration operates as described below.

In a configuration-generation phase, the system-setting program registers in the configuration DB, in accordance with input from the user the following: target AP names, relevant AP names, an interaction method, coordinate information of data that are to be collected from related windows, and a data conversion method. In an interaction phase, the interaction information collection unit identifies the display window of the target AP and the relevant AP in accordance with interaction procedures that have been stored in the configuration DB and collects interaction data from the display window of the target AP according to the coordinate information in the interaction procedures. The interaction information collection unit next transfers the interaction data that have been collected to interaction AP, and the processing result of the interaction AP is transferred to the data output unit by way of a communication unit. The data output unit supplies the processing result that has been received to the display window of the target AP and the relevant AP.

XPath (XML Path Language) (see Non-Patent Document 4) is known as a language for designating items in tree-structure data such as HTML that describes a Web page and XAML (Extensible Application Markup Language) for representing the screen configuration by XML (see Non-Patent Document 3). In addition, Servlet (see Non-Patent Document 5) is known as a function for executing a program on a Web server.

Patent Document 1: JP-A-2005-285009 (paragraphs 0037-0041)
Non-Patent Document 1: "CORBA" (online) Object Management Group, searched Nov. 15, 2006, Internet URL: http://www.omg.org/technology/documents/formal/corba_iiop.htm
Non-Patent Document 2: "COM" (online) Microsoft, (searched on Nov. 15, 2006) Internet URL: http://www.microsoft.com/japan/com/compapers.asp
Non-Patent Document 3: "XAML" (online) Microsoft (searched Nov. 15, 2006) Internet URL: http://windowssdk.msdn.microsoft.com/en-us/library/ms752059.aspx
Non-Patent Document 4: "XPath" (online) The World Wide Web Consortium, (searched Nov. 15, 2006) Internet URL: http://www.w3.org/TR/xpath
Non-Patent Document 5: "Servlet" (online) Java Community Process (searched Nov. 15, 2006) Internet URL: http://jcp.org/aboutJava/communityprocess/final/jsr154/index.html

DISCLOSURE OF THE INVENTION

Problem to be Solved by the Invention

The first problem of the above-described art is that, when the target AP or environment has been altered, interaction is not possible until the registration operation of the interaction procedure is again carried out. This is because, in the above-described art, interaction is realized in accordance with a registered interaction procedure, and the interaction process cannot be realized when the registered information does not completely match with the information of the APs that are executing interaction.

The second problem of the above-described art is the necessity for a registration operation to realize interaction of a new AP pair. The reason for this problem is the requirement to make settings of the interaction procedures for each AP pair that carries out interaction, and because the interaction process does not operate at all for an AP pair for which settings have not been made in the configuration DB, a special registration operation for the target AP pair must be carried out.

The third problem of the above-described art is the necessity to reset all interaction procedures when any one of interacting APs is altered. The reason for this is that the entire interaction procedure is registered as a single item of data in the above-described art, whereby the entire interaction procedure becomes unusable when any one AP is altered.

The fourth problem of the above-described art is the high cost for setting the interaction procedure. The reason for this high cost is the inability to operate correctly when the interaction procedure is wrong in the above-described art and the consequent necessity to set the interaction procedures to operate correctly for all cases.

It is an object of the present invention to provide an application interaction system, an application interaction server, an extraction-side interaction device, a paste-side interaction device, an application interaction proxy server, an application interaction method, a recording medium, and an application interaction program that can solve the above-described problems.

Essentially, the present invention has the object of providing an application interaction system, an application interaction server, an extraction-side interaction device, a paste-side interaction device, an application interaction proxy server, an application interaction method, an application interaction program and a recording medium that: enable correction of interaction procedures by a correction operation on an AP without carrying out a new registration operation of the interaction procedure even when a target AP has been altered; and enable setting of the interaction procedures based on a user's operation on an AP even when realizing interaction of a new AP pair.

Means for Solving the Problem

The application interaction system according to the present invention is an application interaction system for executing processes for extracting data from a first application in accordance with an extraction rule that includes information that can specify data that are to be extracted and, in accordance with a conversion rule that includes information that can specify a paste position, pasting to a second application the data that were extracted from the first application; the application interaction system being provided with: extraction rule storage means for storing the extraction rules; conversion rule storage means for storing the conversion rules; extraction rule selection means for selecting an extraction rule that is stored in the extraction rule storage means in accordance with a request to extract data; information extraction means for extracting data from the first application in accordance with an extraction rule that was selected by the extraction rule selection means; conversion rule selection means for selecting a conversion rule that is stored in the conversion rule storage means in accordance with a request to paste data; and data output means for, in accordance with a conversion rule that was selected by the conversion rule selection means, supplying data that were extracted by the information extraction means for pasting in the second application; the application interaction system further including either one or both of: extraction rule feedback means for presenting to the first application an extraction rule that was selected by the extraction rule selection means and supplying the extraction rule following alteration in accordance with data alteration instructions that are specified by the extraction rule that was presented or paste feedback means for supplying information indicating the content of alteration according to data alteration instructions supplied by the data output means.

The application interaction server according to the present invention is an application interaction server in an application interaction system for executing processes for extracting data from a first application in accordance with an extraction rule that includes information that can specify data that are to be extracted and, in accordance with a conversion rule that includes information that can specify a paste position, pasting to a second application data that were extracted from the first application; the application interaction server being provided with: extraction rule storage means for storing the extraction rules; conversion rule storage means for storing the conversion rules; extraction rule selection means for selecting an extraction rule that is stored in the extraction rule storage means in accordance with a request to extract data; information extraction means for extracting data from the first application in accordance with an extraction rule that was selected by the extraction rule selection means; extraction rule feedback reflection means for, in accordance with an alteration request, correcting extraction rules that are stored in the extraction rule storage means; conversion rule selection means for selecting a conversion rule that is stored in the conversion rule storage means in accordance with a request to paste data; and conversion rule feedback reflection means for, in accordance with an alteration request, correcting a conversion rule that is stored in the conversion rule storage means.

The extraction-side interaction device according to the present invention is used in an application interaction system for executing processes of extracting data from a first application in accordance with an extraction rule that includes information that can specify data that are to be extracted and, in accordance with a conversion rule that includes information that can specify a paste position, pasting to a second application the data that were extracted from the first application, that is an extraction-side interaction device for extracting data from the first application in accordance with the extraction rule that includes information that can specify data that are to be extracted and that are stored by a server; and that is provided with extraction rule feedback means for presenting to the first application an extraction rule that was selected by the server and for supplying the extraction rule after alteration in accordance with data alteration instructions that are specified by the extraction rule that was presented.

The paste-side interaction device according to the present invention is used in an application interaction system for executing processes of extracting data from a first application in accordance with an extraction rule that includes information that can specify data that are to be extracted and, in accordance with a conversion rule that includes information that can specify a paste position, pasting to a second application data that were extracted from the first application; that is a paste-side interaction device for, in accordance with a conversion rule that includes information that can specify a paste position and that is stored by a server, pasting to the second application data that were extracted from the first application; and that is provided with: data output means for supplying data that were extracted from the first application for pasting to the second application in accordance with a conversion rule that was selected by the server, and paste feedback means for supplying information indicating the alteration content according to data alteration instructions that were supplied by the data output means.

The application interaction proxy server according to the present invention is an application interaction proxy server used in an application interaction system for executing processes of extracting data from a first application in accordance with an extraction rule that includes information that can specify data that are to be extracted and that are stored by a server and, in accordance with a conversion rule that includes information that can specify a paste position, pasting to a second application data that were extracted from the first application; and that is provided with: first application control means for causing a terminal device to execute an extraction rule feedback process of presenting to the first application an extraction rule that was selected by the server and supplying the extraction rule following alteration according to data alteration instructions that are specified by the extraction rule that was presented; and second application means for causing a terminal device to execute a data output process of, in accordance with the conversion rule that was selected by the server, supplying data that were extracted by the server for pasting to the second application, and a paste feedback process of supplying information that indicates alteration content according to data alteration instructions that were supplied by the second application.

The application interaction method according to the present invention is an application interaction method for extracting data from a first application in accordance with an extraction rule that includes information that can specify data that are to be extracted and, in accordance with a conversion rule that includes information that can specify a paste position, pasting to a second application data that were extracted from the first application; wherein: an extraction rule that is stored in extraction rule storage means is selected in accordance with a data extraction request; data are extracted from the first application in accordance with the extraction rule that was selected; a conversion rule that is stored in conversion rule storage means is selected in accordance with a data paste request; in accordance with the selected conversion rule, the extracted data are supplied for pasting in the second application; either the extraction rule that was selected is presented to the first application and the extraction rule following alteration according to data alteration instructions that are specified by the extraction rule that was presented are supplied or information indicating the alteration content according to the data alteration instructions that were supplied are supplied, or alternatively, both the extraction rule that was selected is presented to the first application and the extraction rule that follows alteration according to the data alteration instructions that are specified by the extraction rule that was presented is supplied, and further, information indicating the alteration content according to the data alteration instructions that were supplied are supplied.

The application interaction program according to the present invention is an application interaction program that is installed in a computer for executing processes for extracting data from a first application in accordance with an extraction rule that includes information that can specify data that are to be extracted and for, in accordance with a conversion rule that includes information that can specify a paste position, pasting to second application data that were extracted from the first application; the application interaction program causing a computer to execute: an extraction rule selection process of selecting an extraction rule that is stored in extraction rule storage means in accordance with a data extraction request; an information extraction process of extracting data from the first application in accordance with the extraction rule that was selected in the extraction rule selection process; a conversion rule selection process of selecting a conversion rule that is stored in conversion rule storage means in accordance with a data paste request; and a data output process of, in accordance with the conversion rule that was selected in the conversion rule selection process, supplying data that were extracted in the information extraction process for pasting to the second application; and further, for causing the computer to execute either an extraction rule feedback process of presenting to the first application the extraction rule that was selected in the extraction rule selection process and supplying the extraction rule following alteration according to data alteration instructions that are specified by the data extraction rules that was presented or a paste feedback process of supplying information indicating the alteration content according to the data alteration instructions that were supplied in the data output process, or alternatively, for causing the computer to execute both the extraction rule feedback process and the paste feedback process.

The computer-readable recording medium according to the present invention is a computer-readable recording medium that stores an application interaction program that is installed in a computer for executing processes for extracting data from a first application in accordance with an extraction rule that includes information that can specify data that are to be extracted and, in accordance with a conversion rule that includes information that can specify a pasting position, pasting in a second application data that were extracted from the first application, the recording medium recording an application interaction program for causing the computer to execute: an extraction rule selection process of selecting an extraction rule that is stored in extraction rule storage means in accordance with a data extraction request; an information extraction process of extracting data from the first application in accordance with the extraction rule that was selected in the extraction rule selection process; a conversion rule selection process of selecting a conversion rule that is stored in conversion rule storage means in accordance with a data paste request; and a data output process of, in accordance with the conversion rule that was selected in the conversion rule selection process, supplying data that were extracted in the information extraction process for pasting to the second application; and further, for causing the computer to execute either an extraction rule feedback process of presenting to the first application the extraction rule that was selected in the extraction rule selection process and supplying the extraction rule following alteration in accordance with data alteration instructions that are specified by the extraction rule that was presented or a paste feedback process of supplying information indicating the alteration content according to the data alteration instructions that were supplied in the data output process, or alternatively, for causing the computer to execute both the extraction rule feedback process and the paste feedback process.

Effect of the Invention

By adopting the above-described configuration, even when a target AP is altered, the interaction procedures can be corrected without again carrying out the registration operation of the interaction procedure by correcting resulting values on the AP rather than correcting the extraction rules or conversion rules.

BRIEF DESCRIPTION OF THE DRAWINGS

FIG. 2 is an explanatory view showing an extraction rule table;

FIG. 3 is an explanatory view showing extraction information;

FIG. 4 is an explanatory view showing a conversion rule table;

Figure 1:
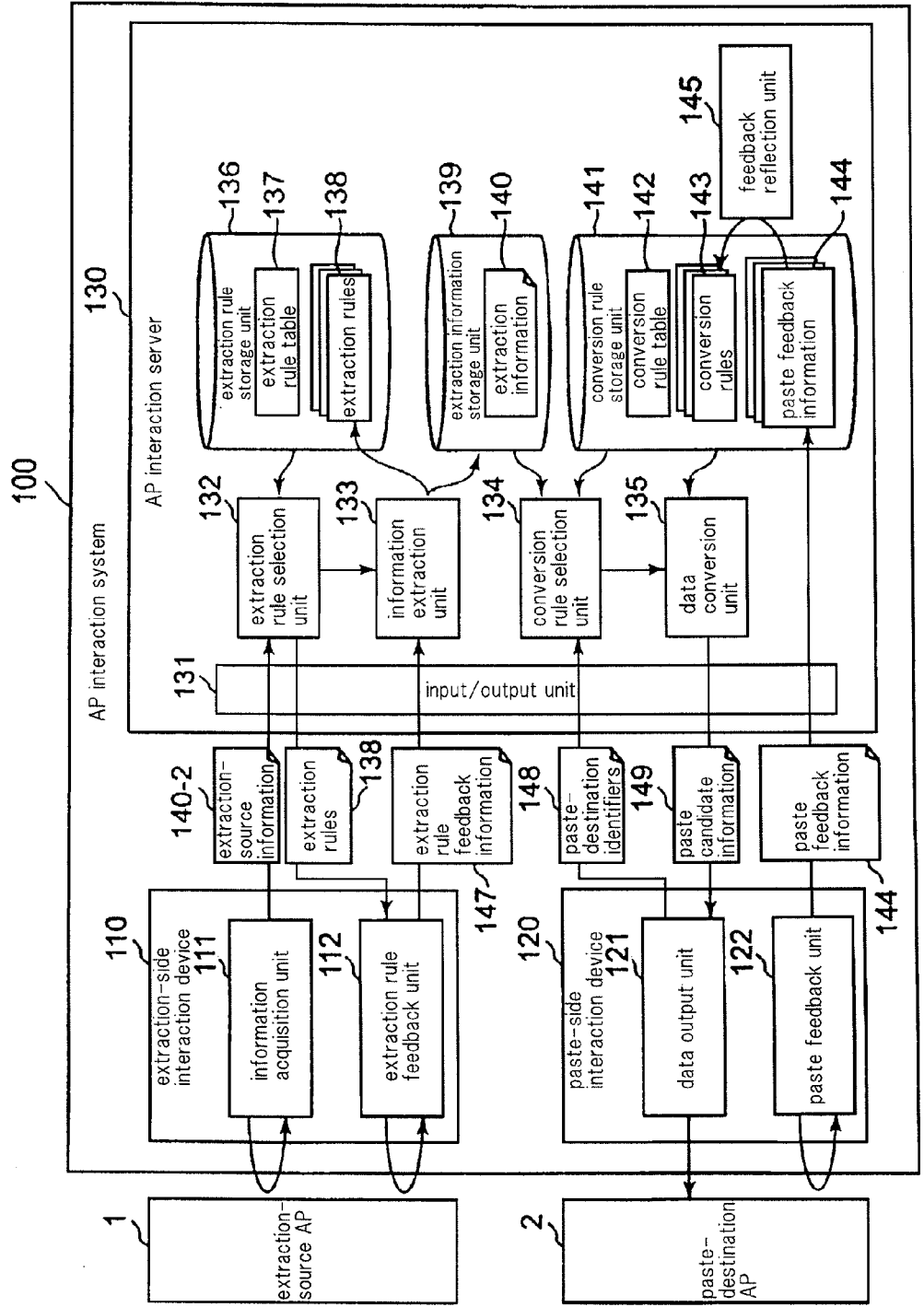
FIG. 1 is a block diagram showing an example of the configuration of an AP interaction system in the first exemplary embodiment.

EXPLANATION OF REFERENCE NUMBERS 1 extraction-source AP
2 paste-destination AP
100 AP interaction system
110 extraction-side interaction device
111 information acquisition unit
112 extraction rule feedback unit
120 paste-side interaction device
121 data output unit
122 paste feedback unit
130 AP interaction server
131 input/output unit
132 extraction rule selection unit
133 information extraction unit
134 conversion rule selection unit
135 data conversion unit
136 extraction rule storage unit
137 extraction rule table
138 extraction rules
139 extraction information storage unit
140 extraction information
140-2 extraction-source information
141 conversion rule storage unit
142 conversion rule table
143 conversion rule
144 paste feedback information
145 feedback reflection unit
147 extraction rule feedback information
148 paste-destination identifier
149 paste candidate information

BEST MODE FOR CARRYING OUT THE INVENTION

First Exemplary Embodiment

Explanation next regards exemplary embodiments of the present invention with reference to the drawings. FIG. 1 is a block diagram showing the first exemplary embodiment of the AP interaction system according to the present invention. The AP interaction system shown in FIG. 1 is provided with extraction-side interaction device 110, paste-side interaction device 120, and AP interaction server 130. Extraction-side interaction device 110 is connected to extraction-source AP 1 and AP interaction server 130 to enable input and output. Paste-side interaction device 120 is connected to paste-destination AP 2 and AP interaction server 130 to enable input and output. More specifically, extraction-source AP 1 is a computer that operates in accordance with extraction-source AP 1. In addition, paste-destination AP 2 is a computer that operates in accordance with paste-destination AP 2.

Initially, a user first designates a data item he or she wishes to extract at a particular extraction-source AP 1 and carries out extraction. The user then designates the data item he or she wishes to paste of the data items that were extracted and carries out pasting. Here, AP interaction server 130 generates and stores extraction rules based on the data items that are extracted by the user. AP interaction server 130 further generates and stores conversion rules based on the correlation between each input/output unit of paste-destination AP 2 and the data item that was pasted.

The user can then extract data items according to the extraction rules from the same extraction-source AP 1 or from extraction-source AP 1 for which the format is identical or similar by simply implementing extraction instructions by, for example, pressing an "extraction button" on the screen without designating the data item he or she wishes to extract. In addition, the user can paste a data item according to conversion rules to each input unit of the same paste-destination AP 2 or to paste-destination AP 2 having a format that is identical or similar to paste-destination AP 2 by simply implementing paste instructions by, for example, pressing a "paste button" on a screen and without designating the data item he or she wishes to paste.

The user can further correct an extraction rule by correcting the data item that was extracted according to the extraction rule. Similarly, the user can correct a conversion rule by correcting a data item that was pasted according to the conversion rule.

Extraction-side interaction device 110 is provided with: information acquisition unit 111 that has the function of accepting extraction instructions from the user and acquiring information from extraction-source AP 1 to transfer extraction-source information 140-2 to AP interaction server 130, and extraction rule feedback unit 112 for presenting extraction rule 138 that was acquired from AP interaction server 130 to extraction-source AP 1 and, when the extraction rule 138 that was presented is corrected by the user's operation, returning extraction rule feedback information 147 that was corrected to AP interaction server 130. Extraction-source information 140-2 is information that is received from extraction-source AP 1 and, for example, is information containing display information in extraction-source AP 1. When, for example, extraction-source AP 1 is a Web browser, extraction-source information 140-2 is an html file of the Web page being displayed.

When extraction-source information 140-2 is represented by tree-structure data (for example, HTML that describes a Web page or XAML [Extensible Markup Language] that expresses screen configuration by XML], extraction rules 138 are preferably described by language that designates items in the tree-structure data (for example, XPath language that designates items in XML).

Paste-side interaction device 120 is provided with: data output unit 121 that has the function of accepting paste instructions from the user and that transfers to AP interaction server 130 paste-destination identifier 148 that indicates paste-destination AP 2, receives paste candidate information 149 from AP interaction server 130, and supplies paste candidate information 149 to each input unit of paste-destination AP 2; and paste feedback unit 122 for, when the values of the input unit of paste-destination AP 2 are corrected by the operation of the user to another paste candidate or to values applied as input by the user, reporting the correction content as paste feedback information 144 to AP interaction server 130.

AP interaction server 130 is provided with: input/output unit 131 for accepting communication from extraction-side interaction device 110 and paste-side interaction device 120; extraction rule selection unit 132, information extraction unit 133, conversion rule selection unit 134 for determining conversion rule 143 that is to be used according to conversion rule table 142 based on the extraction-source identifier and paste-destination identifier 148 that are contained in extraction information 140 that is stored in extraction information storage unit 139; data conversion unit 135 for converting extraction information 140 in accordance with conversion rule 143; extraction rule storage unit 136 for storing extraction rule table 137 and extraction rules 138; extraction information storage unit 139 for storing extraction information 140; conversion rule storage unit 141 for storing conversion rule table 142, conversion rules 143, and paste feedback information 144; and feedback reflection unit 145 for updating conversion rules 143 based on paste feedback information 144.

FIG. 2 is an explanatory view showing an example of extraction rule table 137. As shown in FIG. 2, extraction rule table 137 includes extraction-source identifiers 140-1 and extraction rules 138. Extraction-source identifiers 140-1 is information that can identify extraction-source information 140-2, and for example, that is information such as the "execution file name+window title" or the URI (Uniform Resource Identifiers: a concept that includes URL and referred to as "URL" hereinbelow) of extraction-source information 140-2.

Extraction rules 138 are rules generated based on extraction items that are extracted as a portion of extraction-source information 140-2, and include information that can specify an extraction item (extracted data) in extraction-source information 140-2. Extraction rules 138 are applied to extraction-source information 140-2 that is produced according to the extraction instructions of the user by extraction rule selection unit 132. Extraction items are extracted as a result and supplied to extraction-source AP 1.

FIG. 3 is an explanatory view showing an example of extraction information 140. As shown in FIG. 3, extraction information 140 is information that includes extraction-source identifiers 140-1, extraction-source information 140-2, and extraction items 140-3. Extraction items 140-3 include extraction items 1-n. Extraction information 140 is information showing extraction items 140-3 that have been extracted as a portion of extraction-source information 140-2. Information extraction unit 133 adapts extraction rules 138 to extraction-source information 140-2, whereby extraction items 140-3 are stored in correspondence with extraction-source identifiers 140-1 and extraction-source information 140-2.

FIG. 4 is an explanatory view showing an example of conversion rule table 142. As shown in FIG. 4, conversion rule table 142 includes: extraction-source identifiers 140-1, paste-destination identifiers 148, paste-destination structure information 142-3, and conversion rules 143. Paste-destination identifiers 148 are information that can identify paste-destination AP 2, and for example, are information such as the URL of paste-destination AP 2 or "execution file name+window title." The conversion rules include information that can specify the paste position.

Conversion rules 143 are rules indicating the correspondence relation between each input unit of paste-destination AP 2 and extraction items 140-3 that are pasted. Conversion rules 143 are adapted to extraction items 140-3 when there are paste instructions by the user. As a result, extraction items 140-3 that have been converted are supplied to each input unit of paste-destination AP 2 as paste candidate information 149.

Extraction-source identifiers 140-1 and paste-destination identifiers 148 are each codes for identifying extraction-source AP 1 and paste-destination AP 2, respectively. For example, when extraction-source AP 1 and paste-destination AP 2 are Web applications, the URLs of pages can be used as extraction-source identifiers 140-1 and paste-destination identifiers 148. Alternatively, when extraction-source AP 1 and paste-destination AP 2 are typical APs, a character string that links the execution file name and target window name of the AP (for example, "app.exe:data input window") can be used as extraction-source identifier 140-1 and paste-destination identifier 148. Still further, the data structure of extraction-source AP 1 and paste-destination AP 2 may be analyzed and identifiers that are unique with respect to that structure may be used as extraction-source identifier 140-1 and paste-destination identifier 148. For example, when extracting an identifier from a Web page, the use of the hash value of the text of the HTML header as an identifier enables the use of the same extraction rules and conversion rules in Web pages having the same structure.

Figure 5:
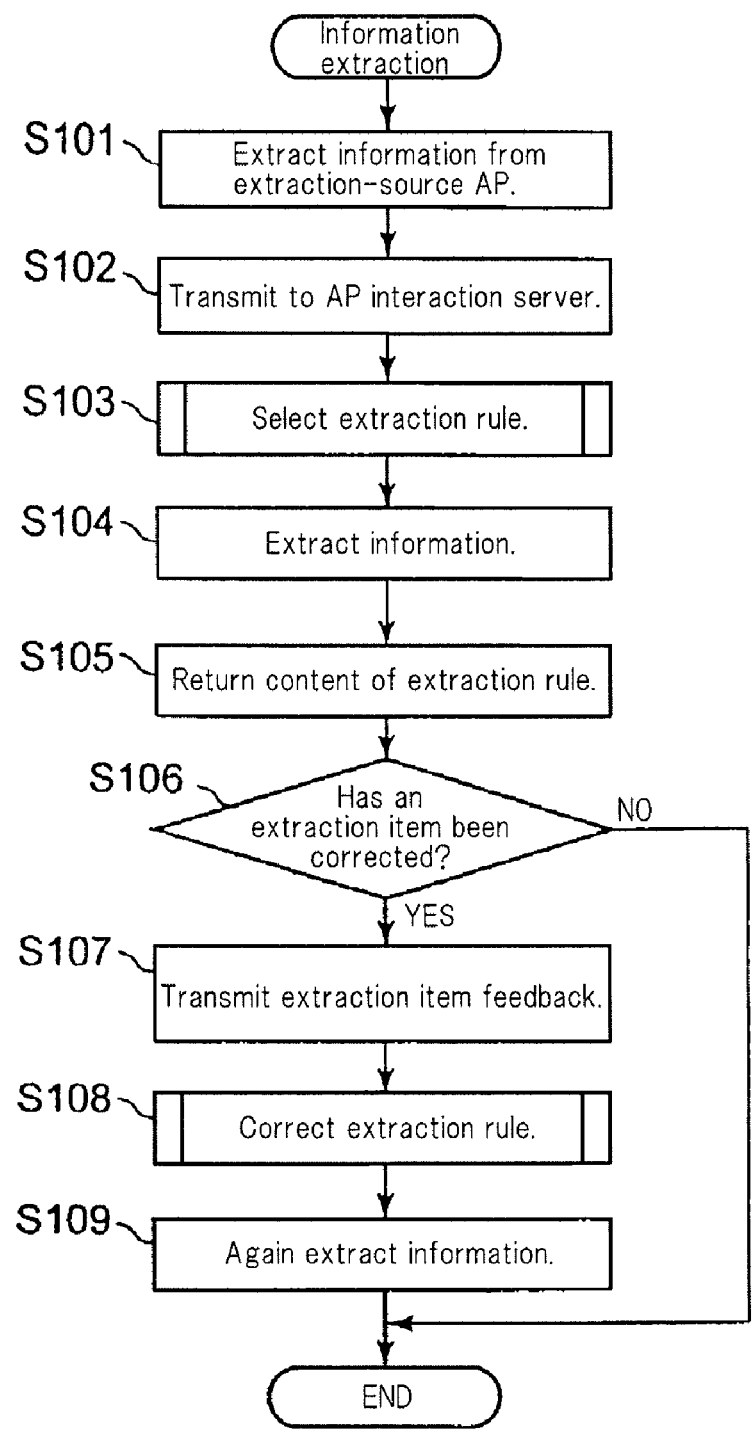
FIG. 5 is a flow chart showing an example of the extraction process.

Explanation next regards the operation of the first exemplary embodiment with reference to the accompanying drawings. Explanation first regards the process of automatically extracting data from extraction-source AP 1 in accordance with extraction instructions from the user when extraction rules 138 have been stored in advance. FIG. 5 is a flow chart showing an example of the extraction process.

Information acquisition unit 111 of extraction-side interaction device 110, upon receiving extraction instructions from the user, extracts information that can be acquired from extraction-source AP 1 (Step S101). Information acquisition unit 111 extracts, for example, information that is being displayed on extraction-source AP 1.

Information acquisition unit 111 transmits the information that was extracted in Step S101 as extraction-source information 140-2 together with extraction-source identifier 140-1 to AP interaction server 130 (Step S102).

Extraction rule selection unit 132 selects extraction rule 138 (Step S103). For example, extraction rule selection unit 132 receives as input extraction-source identifier 140-1 and extraction-source information 140-2 supplied by information acquisition unit 111 by way of input/output unit 131 and selects extraction rule 138 based on extraction-source identifier 140-1 that has been received. The processing method by which extraction rule selection unit 132 selects extraction rule 138 will be explained later.

Information extraction unit 133 next extracts extraction item 140-3 from extraction-source information 140-2 according to extraction rule 138 that was selected in Step S103. Information extraction unit 133 next saves extraction item 140-3, extraction-source information 140-2, and extraction-source identifier 140-1 as extraction information 140 in extraction information storage unit 139 (Step S104). In addition, extraction rule selection unit 132 returns to extraction-side interaction device 110 the extraction rule 138 that was selected (Step S105).

Extraction rule feedback unit 112 that has received extraction rule 138 that was selected presents each item of extraction rule 138 to the user by way of extraction-source AP 1. In other words, extraction rule feedback unit 112 adapts extraction rule 138 that was received as input from AP interaction server 130 to extraction-source information 140-2 to extract extraction items and supplies the result to extraction-source AP 1. Extraction rule feedback unit 112, for example, monitors the correction operations of the user to determine whether the extraction item supplied to extraction-source AP 1 was corrected or not (Step S106).

If the user gave instructions for the correction of extraction rule 138 in Step S106 (YES), extraction rule feedback unit 112 transmits the extraction rule that was corrected as extraction rule feedback information 147 to AP interaction server 130 (Step S107). For example, a case can be considered in which an item that the user wishes to extract is not included in the extraction items supplied to extraction-source AP 1 and the user gave instructions for the correction of the extraction rule. When, for example, the user has designated new extraction items, extraction rule feedback unit 112 generates extraction rule feedback information 147 as a new extraction rule based on the extraction item designated by the user and supplies this result to AP interaction server 130. If the user has not given instructions for the correction of extraction rule 138 in Step S106 (NO), AP interaction system 100 terminates the series of processes.

Information extraction unit 133 of AP interaction server 130 corrects extraction rule 138 that is stored based on extraction rule feedback information 147 (Step S108). The processing method by which information extraction unit 133 corrects extraction rule 138 will be explained later.

Information extraction unit 133 again extracts extraction items 140-3 from extraction-source information 140-2 contained in extraction information 140 that is saved in extraction information storage unit 139 in accordance with new extraction rule 138 and again saves extraction items 140-3 in extraction information storage unit 139 (Step S109).

Figure 6:
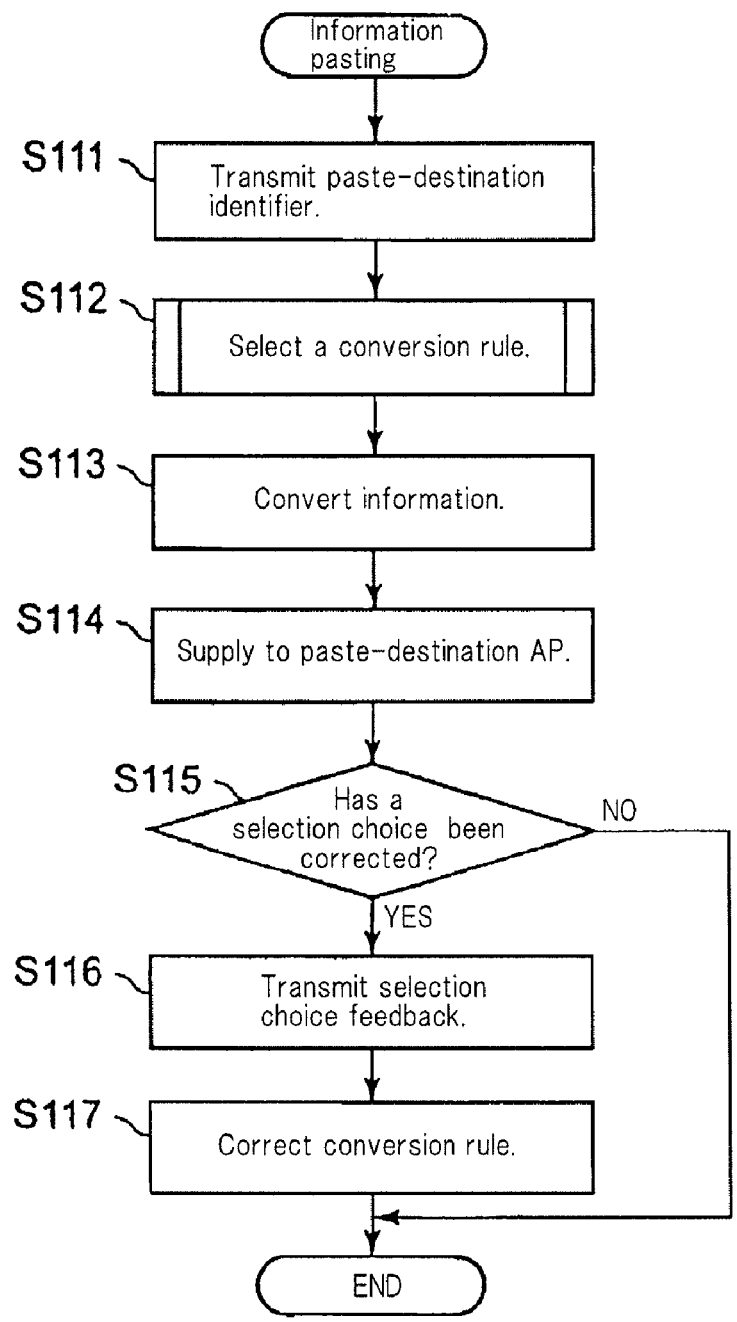
FIG. 6 is a flow chart showing an example of the pasting process.

Explanation next regards the process for automatically pasting data to paste-destination AP 2 according to paste instructions from the user when conversion rule 143 has been stored in advance. FIG. 6 is a flow chart showing an example of the paste process.

Data output unit 121 of paste-side interaction device 120, upon receiving paste instructions from the user, transmits paste-destination identifier 148 to AP interaction server 130 (Step S111).

Conversion rule selection unit 134 next selects conversion rule 143 that will be used (Step S112). Conversion rule selection unit 134 both receives as input paste-destination identifier 148 supplied by data output unit 121 by way of input/output unit 131 and extracts extraction-source identifier 140-1 from extraction information 140, and based on extraction-source identifier 140-1 and paste-destination identifier 148 that have been received, selects conversion rule 143. The method by which conversion rule selection unit 134 selects conversion rule 143 will be described later.

Data conversion unit 135 next, in accordance with conversion rule 143 that was selected, converts extraction information 140 that is stored in extraction information storage unit 139 (Step S113). For example, data conversion unit 135 adapts conversion rule 143 to extraction items 140-3 that are contained in extraction information 140 and transmits the adaptation results as paste candidate information 149 to paste-side interaction device 120.

Data output unit 121, having accepted paste candidate information 149, supplies items corresponding to paste candidate information 149 to each input unit of paste-destination AP 2 (Step S114). For example, data output unit 121 receives as input paste candidate information 149 that contains extraction items 140-3 that have been placed in correspondence to each input unit of paste-destination AP 2 and supplies the corresponding extraction items 140-3 to each input unit of paste-destination AP 2.

Paste feedback unit 122 monitors the user's correction operations and determines whether the items supplied to paste-destination AP 2 have been corrected or not (Step S115). When items supplied to paste-destination AP 2 have been corrected in Step S115 (YES), paste feedback unit 122 transmits to AP interaction server 130 which items have been corrected and the manner of correction as paste feedback information 144. For example, paste feedback unit 122 generates paste feedback information 144 as a new conversion rule based on the items that have been corrected by the user and transmits the paste feedback information 144 to AP interaction server 130. If the items supplied to paste-destination AP 2 have not been corrected in Step S115 (NO), AP interaction system 100 terminates the series of processes.

AP interaction server 130 stores paste feedback information 144 in conversion rule storage unit 141 (Step S116). Feedback reflection unit 145 corrects conversion rule 143 to output values that have been corrected by the user in accordance with paste feedback information 144 that is stored in conversion rule storage unit 141 (Step S117).

Figure 7:
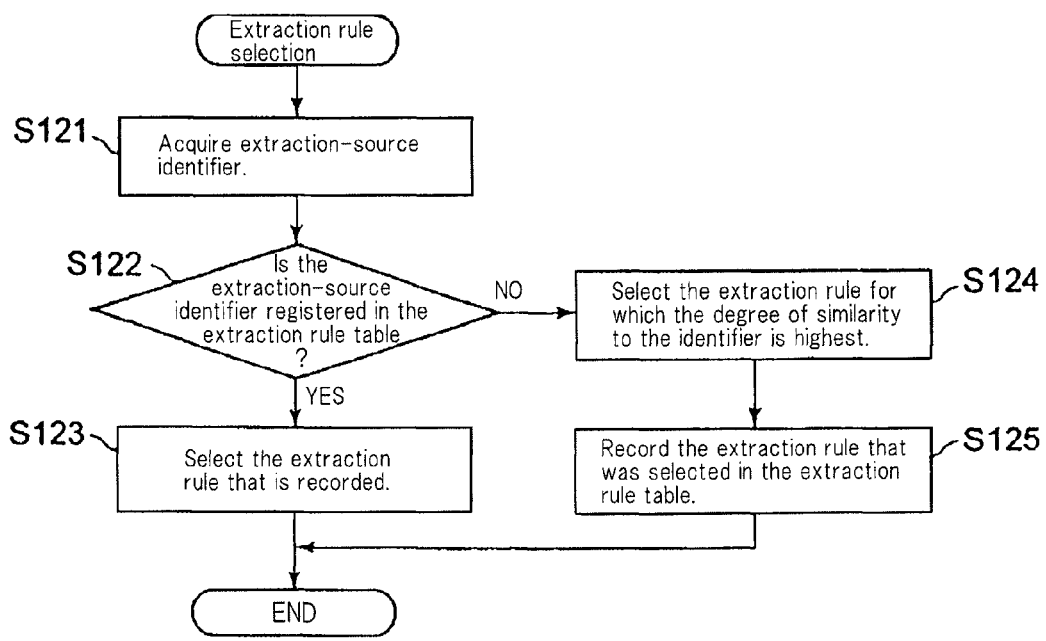
FIG. 7 is a flow chart showing an example of the extraction rule selection process.

Explanation next regards the method of selecting an extraction rule with reference to the flow chart of FIG. 7. FIG. 7 is a flow chart showing an example of the extraction rule selection process in Step S103 shown in FIG. 5. Extraction rule selection unit 132 acquires extraction-source identifier 140-1 (Step S121). Extraction rule selection unit 132 searches for extraction-source identifier 140-1 that has been received as input from extraction rule table 137 (Step S122). In other words, extraction rule selection unit 132 determines whether extraction-source identifier 140-1 that has been received as input is registered in extraction rule table 137.

When extraction-source identifier 140-1 that was received as input is recorded in extraction rule table 137 in Step S122 (YES), extraction rule selection unit 132 selects extraction rule 138 that is recorded (Step S123). In other words, extraction rule selection unit 132 selects an extraction rule that contains matched extraction-source identifier 140-1.

If extraction-source identifier 140-1 that was received as input is not registered in extraction rule table 137 in Step S122 (NO), extraction rule selection unit 132 selects as the initial extraction rule extraction rule 138 that corresponds to, from among extraction-source identifiers 140-1 registered in extraction rule table 137, extraction-source identifier 140-1 having the highest degree of concurrence with extraction-source identifier 140-1 that was received as input (Step S124). In other words, extraction rule selection unit 132 selects extraction rule 138 that contains extraction-source identifier 140-1 that is most similar. Extraction rule selection unit 132 seeks the degree of concurrence based on, for example, the difference in the character strings of extraction-source identifier 140-1 received as input and extraction-source identifier 140-1 that is registered. Extraction rule selection unit 132 then records extraction rule 138 that was selected as the initial extraction rule in extraction rule table 137 in correspondence with extraction-source identifier 140-1 that was received as input (Step S125).

Figure 8:
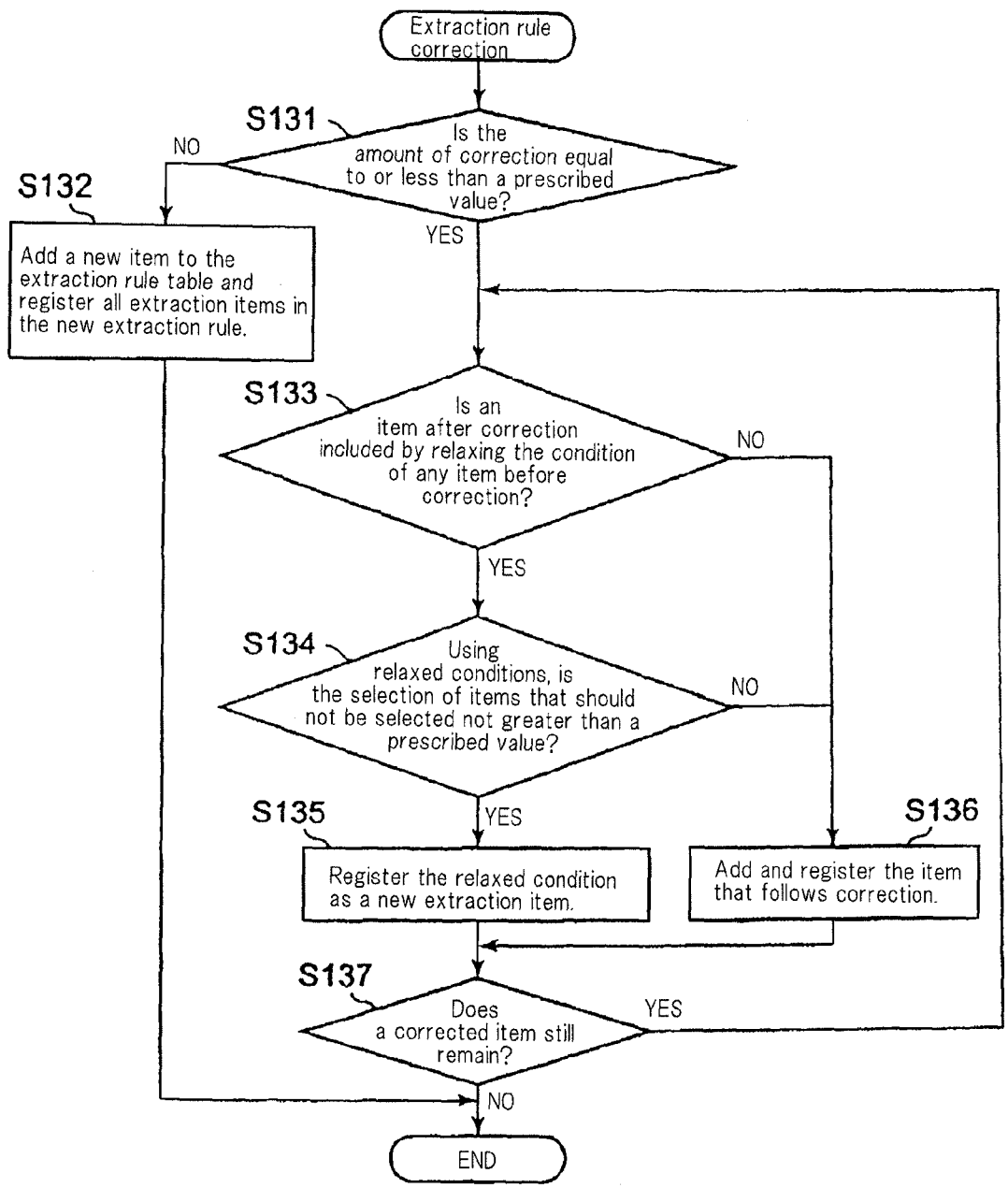
FIG. 8 is a flow chart showing an example of the extraction rule correction process.

Explanation next regards the method of correcting extraction rules with reference to the flow chart of FIG. 8. FIG. 8 is a flow chart showing an example of the extraction rule correction process in Step S108 shown in FIG. 5.

Information extraction unit 133, having received extraction rule feedback information 147, compares extraction rule 138 before and after correction (Step S131). If in Step S131 the amount of correction is greater than a prescribed value (NO), information extraction unit 133 determines that extraction rule 138 that was selected was not correct, adds a new item to extraction rule table 137, registers extraction rule 138 following correction in extraction information storage unit 139 in association with extraction-source identifier 140-1 (Step S132) and terminates the extraction rule correction process.

If the amount of correction in Step S131 is no greater than a prescribed value (YES), the process transits to Step S133. In Step S133, information extraction unit 133 determines whether alteration is possible such that the item after correction is contained by relaxing the condition of any item before correction. If it is determined that alteration is possible in Step S133 (YES), the process proceeds to Step S134.

In Step S134, information extraction unit 133 determines whether, as a side effect of relaxing conditions, the number of items that should not be selected does not surpass a predetermined prescribed value. If it is determined in Step S134 that an excessive number is not selected (YES), information extraction unit 133 registers the relaxed condition as a new extraction item in extraction information storage unit 139 (Step S135) and proceeds to Step S137.

If there is no concurrence in the determinations of Steps S133 and S134 (NO), information extraction unit 133 adds and registers the item after correction (Step S136) and proceeds to Step S137. Information extraction unit 133 determines whether the operations from Step S133 to Step S136 have been executed for all correction items (Step S137), and if it is determined that all operations have not been executed (YES), proceeds to Step S133. If it is determined that all operations have been executed (NO), information extraction unit 133 terminates the extraction rule correction process.

Figure 9:
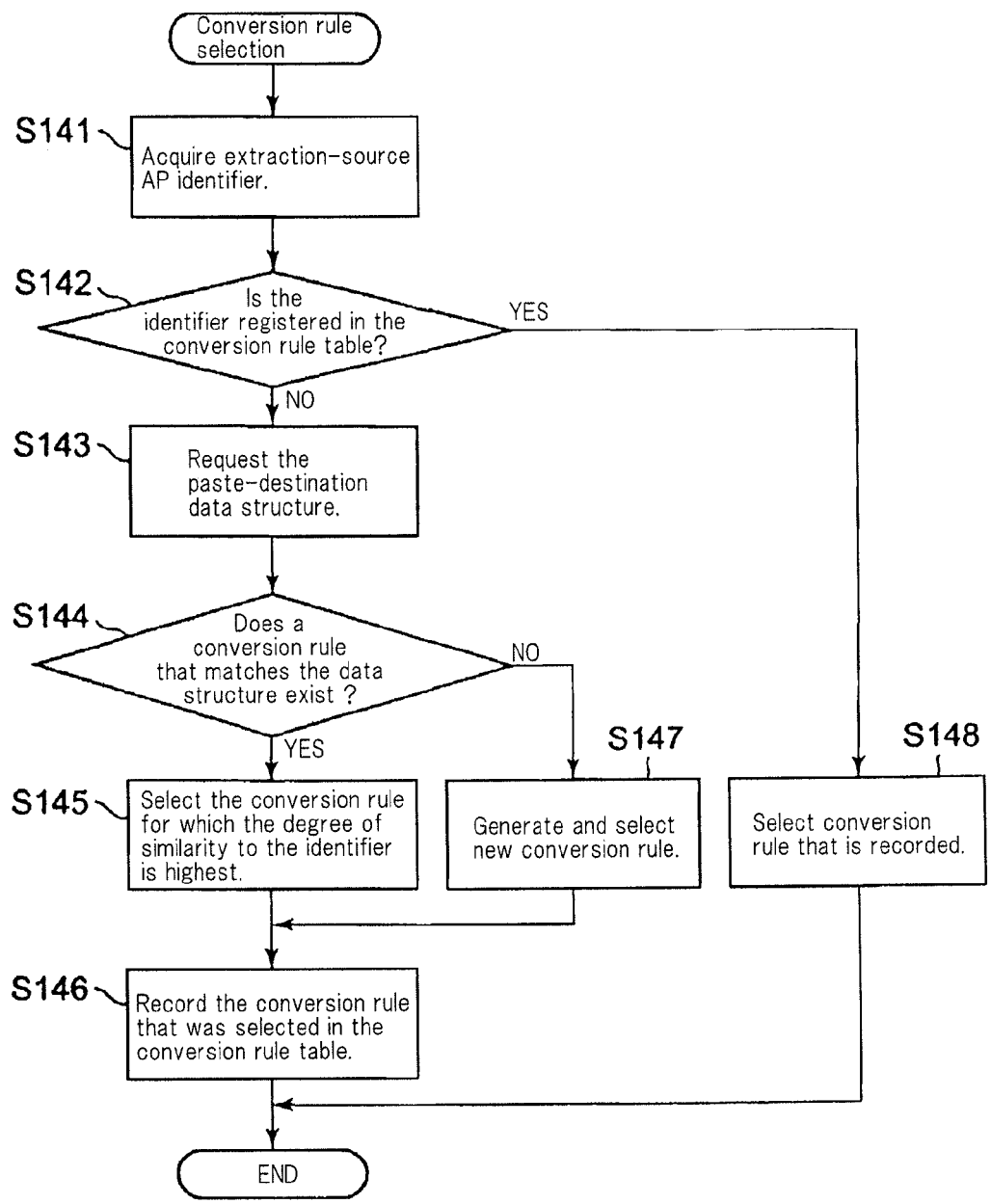
FIG. 9 is a flow chart showing an example of the conversion rule selection process.

Explanation next regards the method of selecting a conversion rule with reference to the flow chart of FIG. 9. FIG. 9 is a flow chart showing an example of the conversion rule selection process in Step S112 shown in FIG. 6.

Conversion rule selection unit 134, having received paste-destination identifier 148, acquires extraction-source identifier 140-1 of extraction information 140 that is stored in extraction information storage unit 139 (Step S141) and searches for extraction-source identifier 140-1 and paste-destination identifier 148 from conversion rule table 142. Here, conversion rule selection unit 134, for example, receives paste-destination identifier 148 that was supplied by data output unit 121 by way of input/output unit 131.

Conversion rule selection unit 134 determines whether paste-destination identifier 148 and extraction-source identifier 140-1 that have been received as input are registered in conversion rule table 142 (Step S142). If paste-destination identifier 148 and extraction-source identifier 140-1 are both registered (YES), conversion rule selection unit 134 selects the conversion rule that are recorded (Step S148) and terminates the conversion rule selection process.

If either or both of paste-destination identifier 148 and extraction-source identifier 140-1 are not registered in conversion rule table 142 (NO), conversion rule selection unit 134 issues a request to paste-side interaction device 120 to obtain paste-destination structure information 142-3 of the data received by paste-destination AP 2 (Step S143). Conversion rule selection unit 134 then searches conversion rule table 142 by means of paste-destination structure information 142-3 of paste-destination AP 2 and determines whether paste-destination structure information 142-3 matches or not (Step S144).

If paste-destination structure information 142-3 matches in Step S144 (YES), conversion rule selection unit 134 selects, from among the items registered in conversion rule table 142, conversion rule 143 in which paste-destination AP structure information 142-3 and extraction-source identifier 140-1 have the greatest similarity (have the highest degree of concurrence) (Step S145) and proceeds to Step S146. For example, conversion rule selection unit 134 selects conversion rule 143 that corresponds to paste-destination structure information 142-3 that matches paste-destination structure information 142-3 of paste-destination AP 2 and extraction-source identifier 140-1 that is most similar to extraction-source identifier 140-1 that was received as input. Here, when extraction-source identifiers 140-1 are similar, the data that are extracted and pasted can be inferred to be similar, and conversion rule selection unit 134 therefore preferably selects conversion rule 143 that corresponds to similar extraction-source identifier 140-1.

The degree of similarity is found as, for example, the difference between identifier character strings. In other words, extraction rule selection unit 132 or conversion rule selection unit 134 determines that the degree of similarity is high when the difference between identifier character strings is no greater than a prescribed value and determines that the degree of similarity is highest when the difference between the identifier character strings is the lowest. In a different example, when the identifiers are indicated by URLs, extraction rule selection unit 132 and conversion rule selection unit 134 may separate URLs by the punctuation marks "." or "/" and, taking each of the punctuated portions as elements, find the degree of similarity by the number of matching elements. In other words, extraction rule selection unit 132 and conversion rule selection unit 134 determine that the degree of similarity is high when the number of matching elements is greater than a prescribed value or determines the highest degree of similarity when the number of matching elements is highest. Adopting this method of finding the degree of similarity facilitates the acquisition of conversion rules of the same type of AP that are disposed in another server and increases the potential for eliminating the need for correction.

When a similar conversion rule 143 is not registered, conversion rule selection unit 134 produces and selects new conversion rules 143 (Step S147). For example, when paste-destination structure information 142-3 does not match in Step S144 (NO), conversion rule selection unit 134 produces and selects new conversion rule 143 and proceeds to Step S146. In addition, conversion rule selection unit 134 registers conversion rule 143 that was selected in the conversion rule table (Step S146) and terminates the conversion rule selection process.

In the present exemplary embodiment, a configuration is adopted in which correction operations by the user are fed back and returned to the AP interaction server and the AP interaction server corrects extraction rules and conversion rules by means of the information that was fed back, whereby the user can define and correct the interaction procedure with fewer operations.

The above-described actions and effects are produced if AP interaction system 100 includes extraction rule storage unit 136, conversion rule storage unit 141, extraction rule selection unit 132, information extraction unit 133, conversion rule selection unit 134, and input/output unit 131, and further, includes extraction rule feedback unit 112 or paste feedback unit 122.

In the present exemplary embodiment, the system is configured such that extraction information is first placed in the AP interaction server, whereby interaction is possible even in the case of APs that operate on different computers in which the extraction-source AP and paste-destination AP are different.

In the present exemplary embodiment, moreover, the conversion rules are saved in the AP interaction server, and extraction rules and conversion rules in which feedback is reflected can therefore be used by other users or on other computers.

Although a case was shown in the present exemplary embodiment in which the extraction-side interaction device and paste-side interaction device are realized separately, a configuration is also possible in which the extraction-side interaction device and paste-side interaction device are a single construction that includes the functions of both. In addition, the extraction-source AP and paste-destination AP may be the same AP. Still further, the information extraction side (extraction-source AP 1 and extraction-side interaction device 110) and the information supply side (paste-destination AP 2 and paste-side interaction device 120) may operate on different apparatuses. For example, the information extraction side may be a personal computer, and the information supply side may be a portable telephone.

In addition, input/output unit 131 is made up from, for example, a Servlet, and as shown in the present exemplary embodiment, may take on all communication of the AP interaction server, or separate input/output units may be provided for each communication item.

In addition, the extraction rule storage unit, extraction information storage unit, and conversion rule storage unit may be constituted by the same memory device, or may be constituted by individual memory devices divided by a different division method than the example shown in the present exemplary embodiment.

Still further, the methods of extraction rule selection, extraction rule correction, and conversion rule selection shown in the present exemplary embodiment are only examples, and an extraction rule selection method that extracts all elements or does not extract anything when extraction rules are not registered, an extraction rule correction method that stores without alteration extraction rules that have been added, and a conversion rule selection method that pastes extracted items in the order of appearance may also be used.

Extraction rule storage unit 136 can typically be referred to as extraction rule storage means. Conversion rule storage unit 141 can typically be referred to as conversion rule storage means. Extraction rule selection unit 132 can typically be referred to as extraction rule selection means. Information extraction unit 133 can typically be referred to as information extraction means. Conversion rule selection unit 134 can typically be referred to as conversion rule selection means. Input/output unit 131 can typically be referred to as data output means. Extraction rule feedback unit 112 can typically be referred to as extraction rule feedback means. Paste feedback unit 122 can typically be referred to as paste feedback means. Extraction information storage unit 139 can typically be referred to as extraction information storage means. Feedback reflection unit 145 can typically be referred to as conversion rule feedback reflection means. Data output unit 121 can typically be referred to as a data output means.

When extraction-side interaction device 110, paste-side interaction device 120, and AP interaction server 130 are a single unit, AP interaction system 100 may be realized by a computer that operates in accordance with a program that is recorded on a CD-ROM, a hard disk, or memory. A hard disk or memory can typically be referred to as a recording medium that can be read by a computer. In this case, this computer functions as extraction-side interaction device 110, paste-side interaction device 120, and AP interaction server 130 by reading and executing the program from the recording medium.

Second Exemplary Embodiment

Explanation next regards the second exemplary embodiment of the present invention. In the present exemplary embodiment, information extraction unit 133 is contained in extraction-side interaction device 110. Information acquisition unit 111 transmits only extraction-source identifier 140-1 to AP interaction server 130.

Extraction rule selection unit 132 selects extraction rule 138 that is to be used based on extraction-source identifier 140-1 and transmits the result to extraction-side interaction device 110.

Information extraction unit 133 extracts information from extraction-source information 140-2 that was acquired by information acquisition unit 111 in accordance with extraction rule 138 that was received and both transmits the information as extraction information 140 to AP interaction server and presents the extracted site to the user.

When a correction operation of extracted sites presented by information extraction unit 133 is carried out by the user, extraction rule feedback unit 112 transmits, for example, extraction rule feedback information 147 to AP interaction server 130. Information extraction unit 133, for example, corrects extraction rules 138 that are stored and again extracts extraction information 140.

In the present exemplary embodiment, the amount of communication can be decreased because, instead of transmitting all extraction-source information to the AP interaction server, only information that is extracted is transmitted.

Third Exemplary Embodiment

Figure 10:
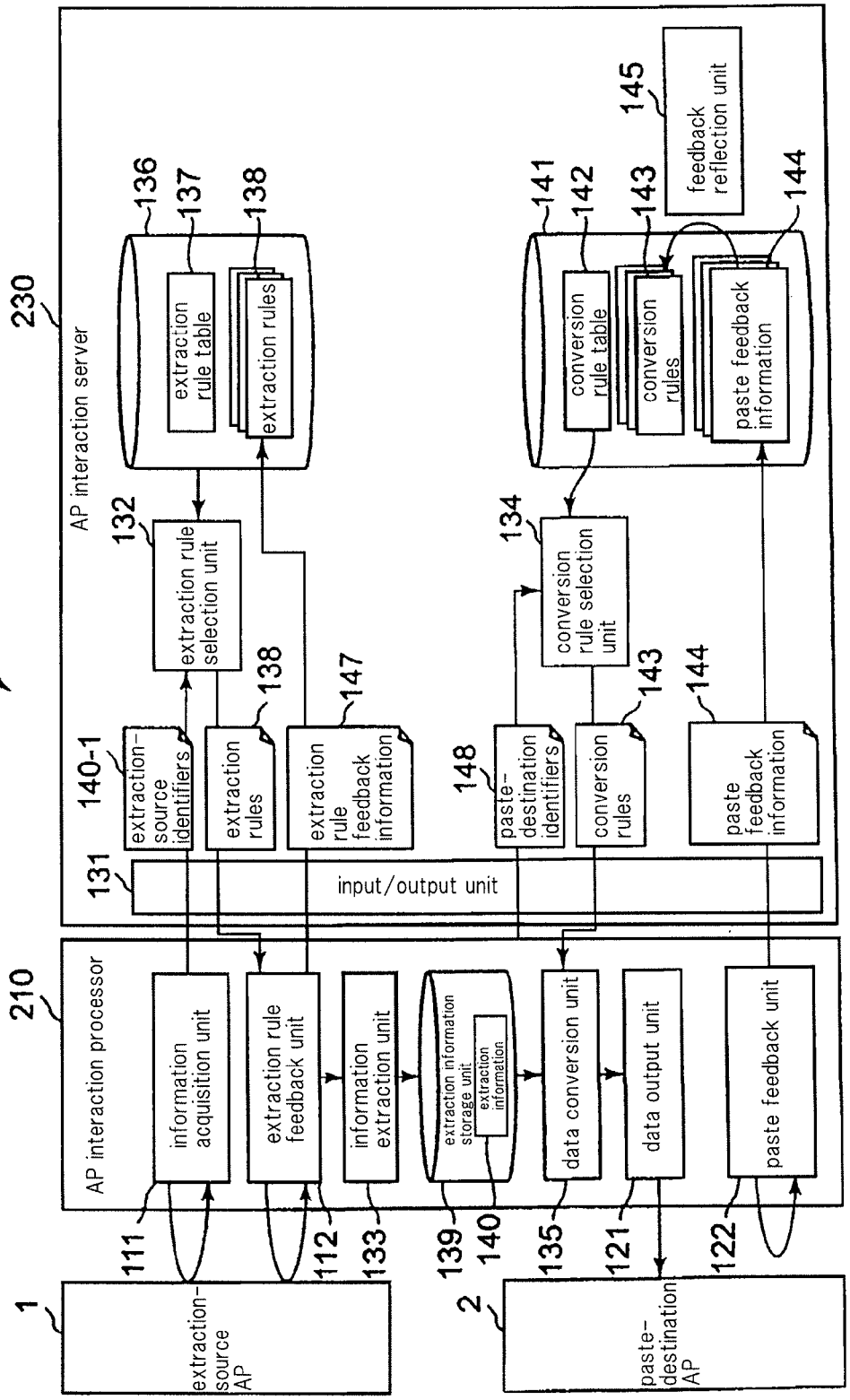
FIG. 10 is a block diagram showing an example of the configuration of the AP interaction system in the second exemplary embodiment.

Explanation next regards the third exemplary embodiment of the present invention with reference to FIG. 10. FIG. 10 is a block diagram showing the third exemplary embodiment of the AP interaction system according to the present invention.

AP interaction system 200 is provided with AP interaction processor 210 that combines the functions of extraction-side interaction device 110 and paste-side interaction device 120 in AP interaction system 100. In addition, information extraction unit 133, extraction information storage unit 139, and data conversion unit 135 that were in AP interaction server 100 are provided in AP interaction processor 210.

AP interaction system 200 that is of this configuration transmits only extraction-source identifier 140-1 to AP interaction server 230 instead of transmitting extraction-source information to AP interaction server 230, receives extraction rule 138, extracts information in AP interaction processor 210, and saves the information in extraction information storage unit 139. When pasting information as well, AP interaction system 200 sends paste-destination identifier 148, receives conversion rule 143 instead of paste candidates, and converts the data in the AP interaction processor.

In the present exemplary embodiment, there is no need to transmit converted data to the AP interaction server, and the amount of communication can therefore be decreased.

A configuration may be adopted in which either extraction rules or conversion rules or both are temporarily stored in AP interaction processor, and in which the AP interaction server acquires the extraction rules or conversion rules when not temporarily stored or when the temporary storage becomes old. In addition, all of the functions of the AP interaction server may be provided in the AP interaction processor. In this case, AP interaction can be realized without carrying out any communication.

Fourth Exemplary Embodiment

Figure 11:
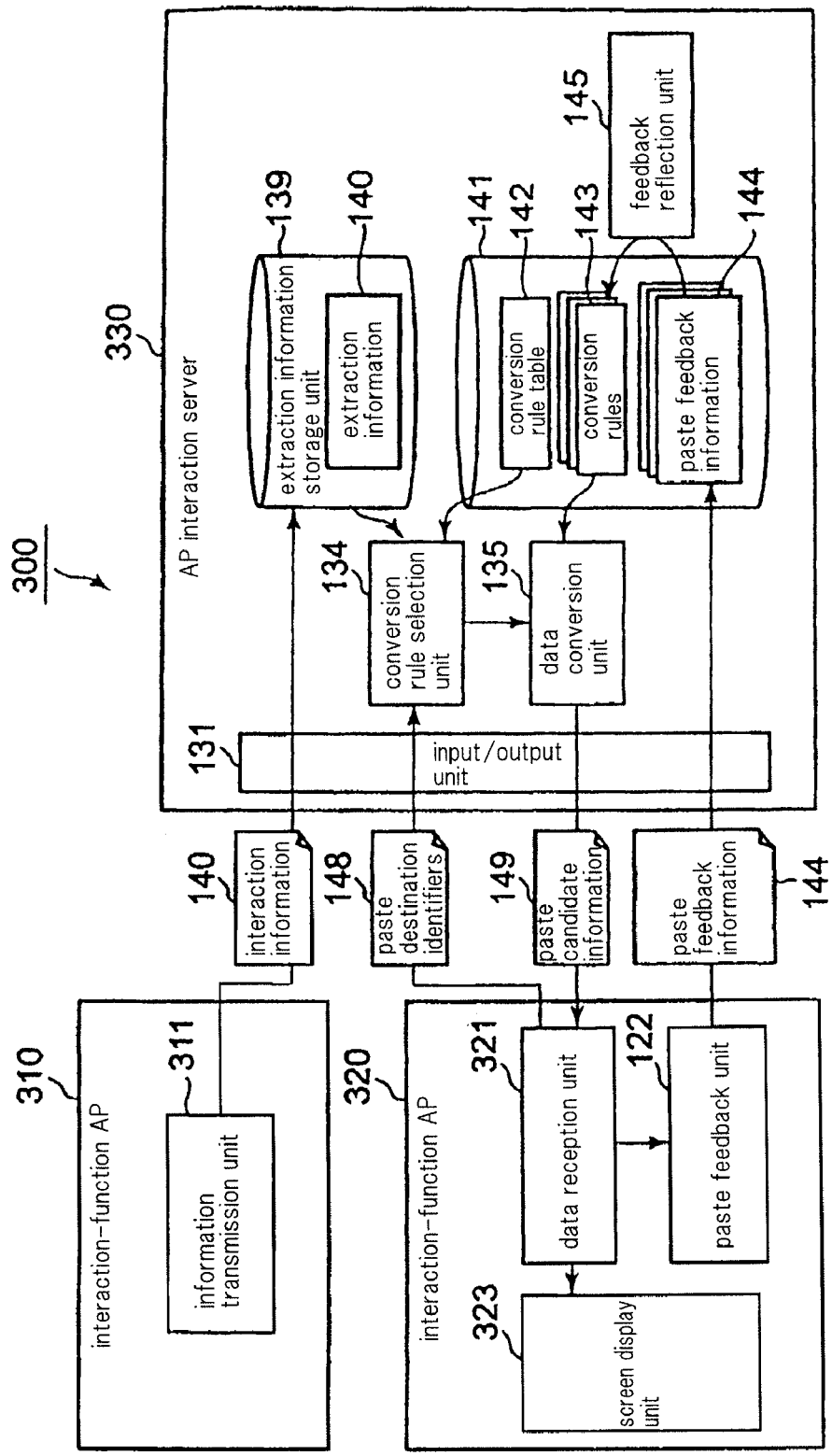
FIG. 11 is a block diagram showing an example of the configuration of the AP interaction system in the fourth exemplary embodiment.

Explanation next regards the fourth exemplary embodiment of the present invention using FIG. 11. FIG. 11 is a block diagram showing the fourth exemplary embodiment of the AP interaction system according to the present invention.

AP interaction system 300 is provided with interaction-function AP 310, interaction-function AP 320, and AP interaction server 330. More specifically, interaction-function AP 310 is a computer that operates in accordance with interaction-function AP 310. Interaction-function AP 320 is a computer that operates in accordance with interaction-function AP 320.

AP interaction server 330 is provided with input/output unit 131, conversion rule selection unit 134, data exchange unit 135, extraction information storage unit 139, conversion rule storage unit 141, and feedback reflection unit 145. Elements of the configuration that are identical to those of AP interaction server 130 in the first exemplary embodiment are given the same reference numbers as in FIG. 1 and explanation is here omitted.

In the present exemplary embodiment, AP interaction server 330 selects conversion rule 143 based on extraction information 140 that is transmitted by interaction-function AP 310 and paste-destination identifier 148 that is transmitted by interaction-function AP 320. AP interaction server 330 then adapts conversion rule 143 to extraction item 140-3 contained in extraction information 140 that was received and transmits the result to interaction-function AP 320 as paste candidate information 149.

Interaction-function AP 310 is provided with information transmission unit 311 and transmits extraction information 140 to AP interaction server 330 according to the instructions of the user. Here, extraction information 140 is, for example, information that contains the extraction items that were designated in interaction-function AP 310.

Interaction-function AP 320 is provided with data reception unit 321, paste feedback unit 122, and screen display unit 323. Data reception unit 321 transmits its own identifier as paste-destination identifier 148 to AP interaction server 330. Data reception unit 321, having received paste candidate information 149, displays the paste candidate items on screen display unit 323 in the AP. Paste feedback unit 322 transmits paste feedback information 144 to AP interaction server 330 in accordance with either the operation of the user or the rules belonging to the AP.

In the present exemplary embodiment, the AP itself has interaction functions, and the items that should be extracted can be appropriately designated according to the design of the AP. As a result, the correction work by the user can be reduced.

In addition, AP interaction server 330 may be of a configuration such that AP interaction server 330 has the same functions as AP interaction server 130 and uses only elements contained in AP interaction server 330 when working with interaction-function AP 310 and uses functions of AP 130 when extracting from another AP.

Fifth Exemplary Embodiment

Figure 12:
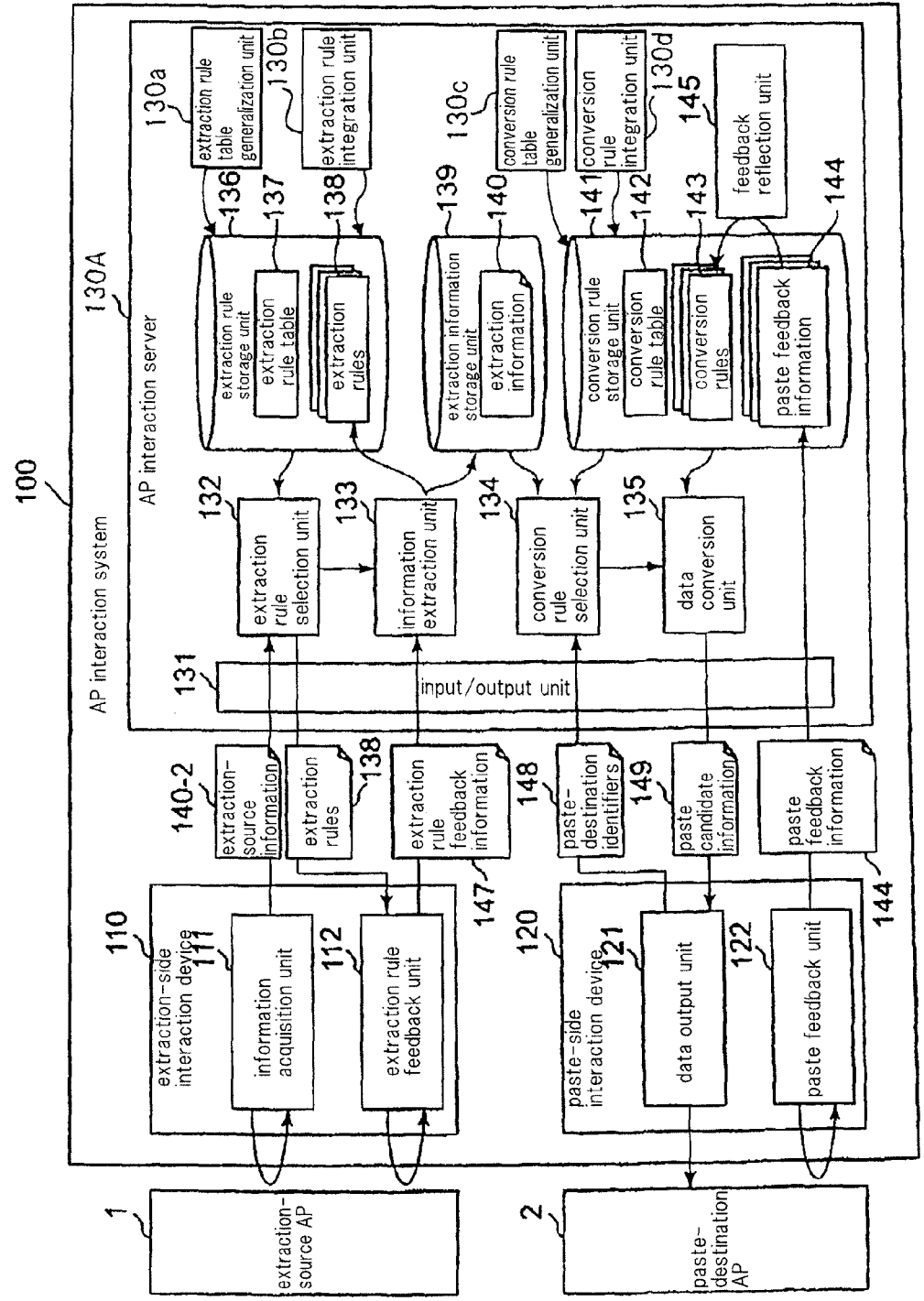
FIG. 12 is a block diagram showing an example of the configuration of the AP interaction system in the fifth exemplary embodiment.

Explanation next regards the fifth exemplary embodiment of the present invention with reference to FIG. 12. In the present exemplary embodiment, AP interaction server 130A is provided with extraction rule table generalization unit 130a, extraction rule integration unit 130b, conversion rule table generalization unit 130c, and conversion rule integration unit 130d, in addition to the configuration of AP interaction server 130 in the first exemplary embodiment. Extraction rule table generalization unit 130a can typically be referred to as extraction rule table generalization means. Extraction rule integration unit 130b can typically be referred to as extraction rule integration means. Conversion rule table generalization unit 130c can typically be referred to as conversion rule table generalization means. Conversion rule integration unit 130d can typically be referred to as conversion rule integration means.

Extraction rule table generalization unit 130a examines the extraction rule table at any timing and lumps together items that can be generalized. For example, items for which extraction rules 138, that are referenced, are the same and all but a portion of extraction-source identifiers 140-1 are the same can be generalized to an item for which the differing parts of the extraction-source identifiers concur with an arbitrary character.

For example, in extraction rule table 137, when http://www.xxx.co.jp/aaaa as extraction-source identifier 140-1 and "rule A" as extraction rule 138 are placed in association with each other; and further, when http://www.xxx.co.jp/bbbb as extraction-source identifier 140-1 and "rule A" as extraction rule 138 are stored in association with each other, extraction rule 138 is the same as "rule A" and the portions http://www.xxx.co.jp of extraction-source identifier 140-1 are equal. Accordingly, extraction rule table generalization unit 130a can generalize the differing parts "aaaa" and "bbbb" of extraction-source identifier 140-1 with an arbitrary character "*." As a result, "http://www.xxx.co.jp/*" as extraction-source identifier 140-1 and "rule A" as extraction rule 138 are stored in association with each other in extraction rule table 137. In other words, extraction rule table generalization unit 130a lumps together extraction rules that correspond to each of a plurality of extraction-source identifiers for which a part concurs as one extraction rule that contains a common extraction-source identifier that can specify each of the plurality of extraction-source identifiers.

At any timing, conversion rule table generalization unit 130c examines conversion rule table 142 and combines items that can be generalized. For example, items for which conversion rules 143, which are being referenced, are the same, for which paste-destination structure information 142-3 is identical, and for which extraction-source identifier 140-1 and paste-destination identifier 148 are also equal other than parts, can be generalized to an item in which the differing parts of the identifiers coincide with an arbitrary character. In other words, conversion rule table generalization unit 130c lumps together into one conversion rule a plurality of conversion rules for which the content of the conversion rules and portions of information that are placed in correspondence with the conversion rules concur.

Extraction rule integration unit 130b examines extraction rules 138 at any timing, lumps together extraction rules 138 that extract the same item into one conversion rule, and places extraction rule table 137 in association with extraction rules 138 that have been lumped together.

For example, a case is described in which, as extraction rules 138, "rule B" is "/html/head/title" and "rule C" is "/html/head/title." In this case, extraction rule integration unit 130b lumps the rules together into one "rule D" because rule B and rule C have the same content. Here if http://www.xxx.co.jp/cccc as extraction-source identifier 140-1 and "rule B" as extraction rule 138 are placed in correspondence and stored in extraction rule table 137, and further, if http://www.xxx.co.jp/dddd as extraction-source identifier 140-1 and "rule C" as extraction rule 138 are placed in correspondence and stored in extraction rule table 137, rule B and rule C are lumped together in rule D, whereby extraction rule integration unit 130b both stores http://www.xxx.co.jp/cccc as extraction-source identifier 140-1 and "rule B" as extraction rule 138 in correspondence with each other in extraction rule table 137, and stores http://www.xxx.co.jp/dddd as extraction-source identifier 140-1 and "rule C" as extraction rule 138 in correspondence with each other in extraction rule table 137. In other words, when there is a plurality of extraction rules for which information that can specify data that are to be extracted is identical, extraction rule integration unit 130b places extraction-source identifiers that correspond to each of these extraction rules in correspondence with one extraction rule.

Conversion rule integration unit 130*d* examines conversion rules 143 at any timing and lumps together conversion rules 143 that carry out identical conversions and places conversion rule table 142 in association with conversion rules 143 that have been lumped together. More specifically, when there is a plurality of conversion rules in which information that can specify a paste position is the same, conversion rule integration unit 130*d* places the extraction-source identifiers and paste-destination identifiers that correspond to each of these conversion rules in correspondence with one conversion rule.

By adopting this configuration in the present exemplary embodiment, extraction rule table generalization unit 130*a* decreases the items of the extraction rule table and thus keeps the size of the extraction rule table small. In addition, because feedback information can be shared among generalized items, extraction rules can be quickly corrected in response to alteration of AP.

Conversion rule table generalization unit 130*c* decreases the items of the conversion rule table and thus keeps the size of the conversion rule table small. In addition, feedback information can be shared among generalized items, whereby conversion rules can be quickly corrected in response to alteration of the AP.

Extraction rule integration unit 130*b* decreases extraction rules and thus keeps the number of extraction rules low. In addition, the ability to share feedback information among integrated items enables quick correction of extraction rules in response to alteration of the AP.

Conversion rule integration unit 130*d* decreases conversion rules and thus keeps the number of conversion rules low. In addition, the ability to share feedback information among integrated items enables quick correction of conversion rules in response to alteration of AP.

A configuration may also be provided with any one of or a combination of any of extraction rule table generalization unit 130*a*, extraction rule integration unit 130*b*, conversion rule table generalization unit 130*c*, and conversion rule integration unit 130*d*.

As an example of the timings of generalization or integration, there are methods in which these operations are implemented upon reaching a particular time. Alternatively, there are methods in which these operations are implemented when the conversion rules and extraction rules that are registered exceed a prescribed number.

In the present system, a configuration is possible in which the results of generalization and integration are presented to the user and the content of the storage unit is corrected upon the confirmation of the user.

When extraction-side interaction device 110, paste-side interaction device 120, AP interaction server 130A are a single unit, AP interaction system 100 may be realized by a computer that operates according to a program recorded on a CD-ROM, a hard disk, or memory. The hard disk or memory can typically be referred to as a recording medium that can be read by a computer. In this case, this computer, by reading the program from the recording medium and executing the program, functions as extraction-side interaction device 110, paste-side interaction device 120, and AP interaction server 130A.

Sixth Exemplary Embodiment

Figure 13:
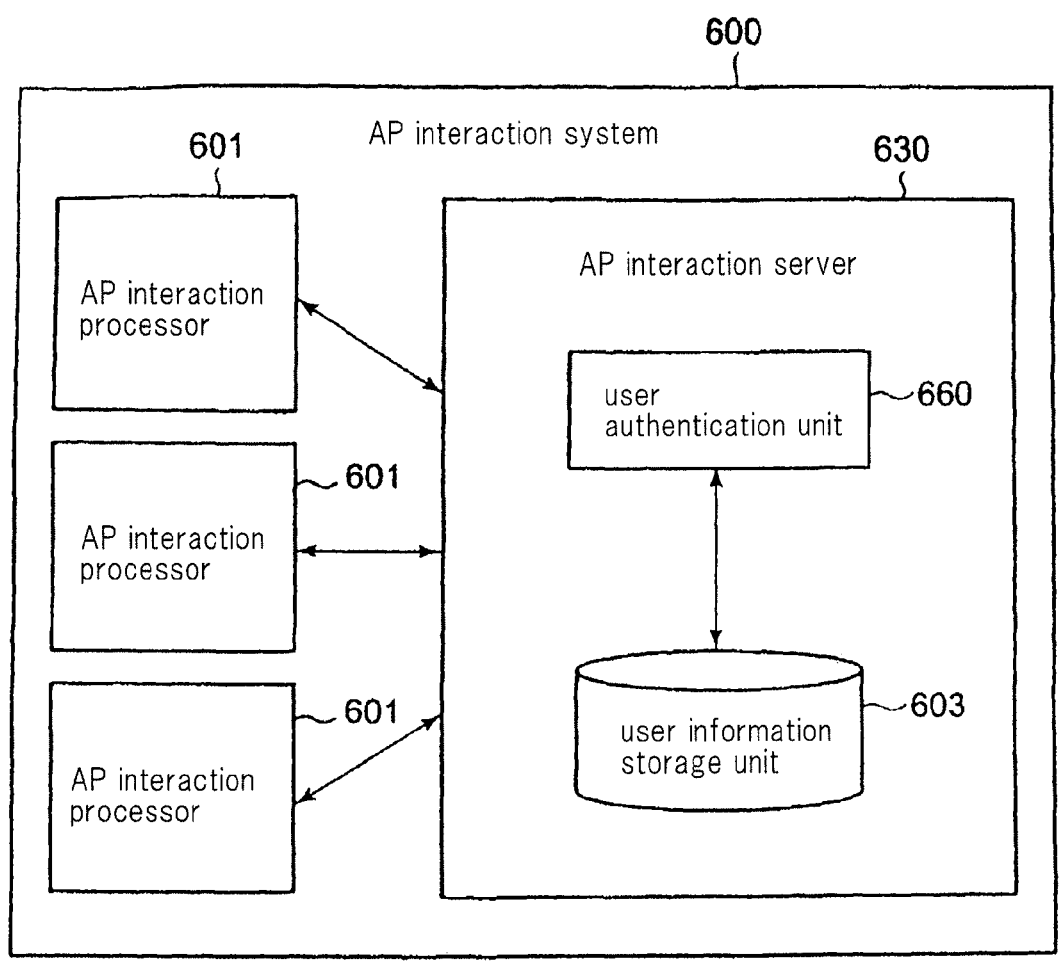
FIG. 13 is a block diagram showing an example of the configuration of the AP interaction system in the sixth exemplary embodiment.

Explanation next regards the sixth exemplary embodiment of the present invention with reference to FIG. 13. FIG. 13 is a block diagram showing the sixth exemplary embodiment of the AP interaction system according to the present invention. AP interaction system 600 is provided with a plurality of AP interaction processors 601 and AP interaction server 630. AP interaction server 630 is provided with user authentication unit 660 and user information storage unit 603 in addition to the configuration of AP interaction server 130.

AP interaction system 600 of this configuration operates as described hereinbelow. Each AP interaction processor 601 transmits user authentication information when communicating with AP interaction server 630. User authentication unit 660 uses the extraction rules and conversion rules stored in user information storage unit 603 in accordance with the user authentication information that was received to carry out the interaction process. When not stored in user information storage unit 603, user authentication unit 660 uses information stored in extraction rule storage unit 136, extraction information storage unit 139, and conversion rule storage unit 141.

User authentication unit 660 further, at any timing, reflects the extraction rules and conversion rules that are stored in user information storage unit 603 to extraction rule storage unit 136, extraction information storage unit 139, and conversion rule storage unit 141. Examples of any timing include the passage of a fixed interval or when fixed information has been stored in user information storage unit 603. In addition, feedback information may always be reflected.

In addition, a configuration is also possible in which, according to instructions from the user, when the information of user information storage unit 603 of another user is reflected, or when the information of user information storage unit 603 becomes old, user authentication unit 660 discards the content of user information storage unit 603 and again acquires information from extraction rule storage unit 136, extraction information storage unit 139, and conversion rule storage unit 141.

According to this configuration of the present exemplary embodiment, the sharing of an AP interaction server among a plurality of users enables a user to obtain the effect of the correction made by another user.

In addition, when a user information storage unit is provided and information is stored in the user information storage unit, the use of this information enables the use of interaction rules that are customized according to the wishes of the user.

Seventh Exemplary Embodiment

Figure 14:
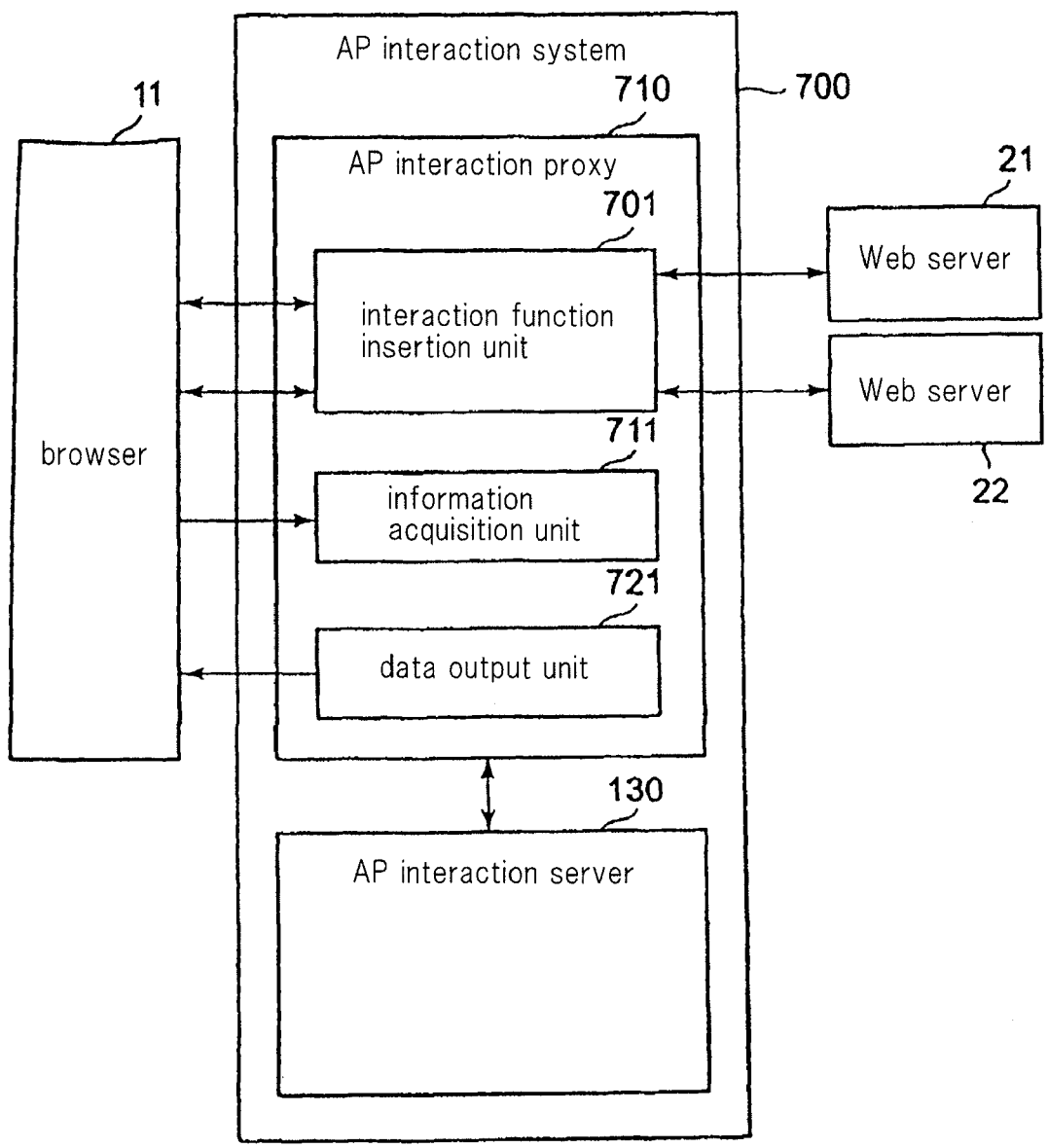
FIG. 14 is a block diagram showing the seventh exemplary embodiment of the AP interaction system according to the present invention.

Explanation next regards the seventh exemplary embodiment of the present invention. FIG. 14 is a block diagram showing the seventh exemplary embodiment of the AP interaction system according to the present invention. AP interaction system 700 is provided with AP interaction proxy (proxy server) 710 and AP interaction server 130. The configuration of AP interaction server 130 is identical to that of AP interaction server 130 in the first exemplary embodiment and a detailed description of this element is therefore here omitted.

AP interaction proxy 710 is provided with: interaction function insertion unit 701, information acquisition unit 711 and data output unit 721. AP interaction proxy 710 is connected to browser 11 (more specifically, a terminal device in which browser 11 is installed) and Web servers 21 and 22 so as to allow communication. FIG. 14 shows a case in which only one browser is connected, but the number of browsers may be two or more. Similarly, FIG. 14 shows a case in which two Web servers are connected, but the number of Web servers may be one, or may be three or more.

When there is a page access request from browser 11, AP interaction proxy 710 connects to the Web server in which the request occurred (for example, Web server 21) to acquire a Web page.

Interaction function insertion unit 701 inserts the extraction function and paste function into the acquired Web page and transfers to the browser. The extraction function and paste function are, for example, described in script language that can be executed by the browser, and are implemented such that an extraction button and paste button are displayed in the corner of the Web page.

For example, as the extraction function, interaction function insertion unit 701 inserts into the Web page the function of extraction-side interaction device 110 in the first exemplary embodiment and transmits to browser 11. As the paste function, interaction function insertion unit 701 inserts into the Web page the functions of paste-side interaction device 120 in the first exemplary embodiment and transmits to browser 11. In other words, interaction function insertion unit 701 corresponds to first application control means for causing a terminal device to execute an extraction rule feedback process of presenting the extraction rule selected by AP interaction server 130 to the first application and supplying the extraction rule following alteration according to the data alteration instructions specified by the extraction rules that were presented. In addition, interaction function insertion unit 701 corresponds to second application means for causing a terminal device to execute: a data output process of supplying data extracted by AP interaction server 130 for, in accordance with the conversion rule selected by AP interaction server 130, pasting to a second application; and a paste feedback process of supplying information indicating the alteration content according to data alteration instructions supplied by the second application.

Information acquisition unit 711 transmits extraction rules supplied by AP interaction server 130 to browser 11. Information acquisition unit 711 further supplies extraction rule feedback information and extraction-source information that were transmitted by browser 11 to AP interaction server 130.

Data output unit 721 transmits paste candidate information that was supplied by AP interaction server 130 to browser 11. In addition, data output unit 721 supplies to AP interaction server 130 paste-destination identifiers and paste feedback information transmitted by browser 11.

When the use of the extraction function is instructed by the user (for example, by clicking on an inserted extraction button), extraction information is transmitted to information acquisition unit 711 by the inserted extraction function. For example, when the extraction button is pressed by the user, the inserted extraction function transmits the extraction-source information to AP interaction server 130 by way of information acquisition unit 711. In addition, the extraction function receives extraction rules from AP interaction server 130 by way of information acquisition unit 711, adapts the extraction rules that were received to the extraction-source information, and supplies the extraction items. The extraction function then, when the extraction items are corrected by the user, generates extraction rule feedback information as new extraction rules and transmits the information by way of information acquisition unit 711 to AP interaction server 130.

When the use of the paste function is instructed by the user (for example, by clicking on the paste button that was inserted), the paste function that was inserted causes paste information to be requested from data output unit 721 and the information that was acquired is supplied into the Web page. For example, when the paste button is pressed by the user, the paste function that was inserted transmits the paste-destination identifier to AP interaction server 130 by way of data output unit 721. In addition, an appending function receives paste candidate information from AP interaction server 130 by way of data output unit 721 and, based on the paste candidate information that was received, supplies data. When the supplied data are corrected by the user, the pasting function generates paste feedback information as a new conversion rule based on the corrected data and transmits the new conversion rule to AP interaction server 130 by way of data output unit 721.

In the configuration shown in FIG. 14, AP interaction proxy 710 and AP interaction server 130 are shown as separate apparatuses, but the functions of AP interaction proxy 710 and the functions of AP interaction server 130 may also be constructed on the same apparatus.

In the above-described explanation, the extraction function has been made active based on the user's instructions, but a configuration is also possible in which, the extraction function is made active and information is extracted when there is a page access request from the browser.

In the above-described explanation, the paste function is made active based on the user's instructions, but a configuration is also possible in which, upon the occurrence of a page access request from the browser, if there are input fields in the page that was acquired and if there is information in AP interaction server 130 that can be supplied to that page, information is supplied to the page in advance in AP interaction proxy 710 and the page is transferred to the browser in the state in which it was supplied.

In the present exemplary embodiment, the browser and Web server can both realize AP interaction without introducing a special device. In addition, using this AP interaction system 700 enables the development of an AP interaction service.

Specific Exemplary Embodiments

Figure 15:
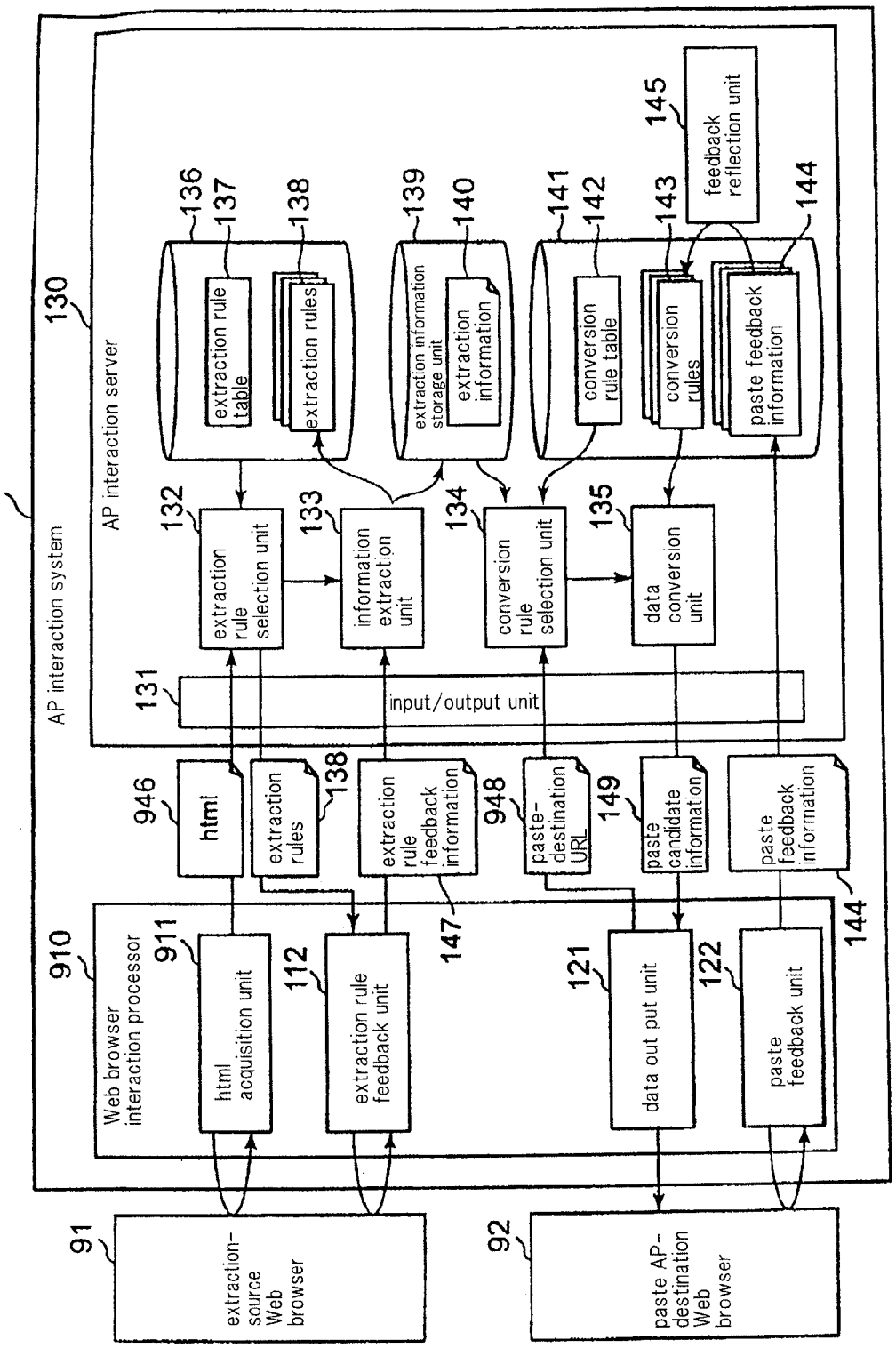
FIG. 15 is a block diagram showing an example of the configuration of the AP interaction system of the present exemplary embodiment.

Explanation next regards the operation of best modes for carrying out the present invention using specific exemplary embodiments. In the first exemplary embodiment, the system according to the present invention is used to enable the extraction/pasting of data between different APs. FIG. 15 is a block diagram showing the first specific exemplary embodiment of the AP interaction system according to the present invention. AP interaction system 900 shown in FIG. 15 is provided with Web browser interaction processor 910 and AP interaction server 130. The configuration of AP interaction server 130 is identical to that of the first exemplary embodiment. Web browser interaction processor 910 corresponds to extraction-side interaction device 110 and paste-side interaction device 120 in the first exemplary embodiment. Web browser interaction processor 910 includes html acquisition unit 911 in place of information extraction unit 111 in the first exemplary embodiment. Web browser interaction processor 910 can be realized as, for example, functions that are built into the tool bar of the browser. In a different example, Web browser interaction processor 910 can be realized as scripts that are registered as extension functions of a browser. Extraction source Web browser 91 is an example of extraction-source AP 1 and paste AP destination Web browser 92 is an example of paste-destination AP 2.

The operation of the specific exemplary embodiment is next described. Upon receiving extraction instructions of the user, Web browser interaction processor 910 acquires html 946 of the Web page that is being displayed and transfers html 946 together with the URL of the page as extraction information to AP interaction server 130. Html 946 corresponds to extraction-source information 140-2 in the first exemplary embodiment. In addition, the URL of the Web page that is being displayed (hereinbelow referred to as the "extraction source page") corresponds to extraction-source identifier 140-1 in the first exemplary embodiment.

Extraction rule selection unit 132 selects extraction rule 138 that is to be used from extraction rule table 137 according to the URL in the extraction information that was received. When extraction rule 138 is not registered in extraction rule table 137, extraction rule selection unit 132 uses extraction rule 138 for which the URL is most similar. An XPath language string can be offered as an example of the expression of extraction rule 138. Extraction rule selection unit 132 transfers extraction rule 138 that was selected to Web browser interaction processor 910. At the same time, information extraction unit 133 extracts information from within html 946 and stores the information in extraction information storage unit 139.

Extraction rule feedback unit 112 shows the user the items extracted in accordance with extraction rule 138 that was received. Extraction rule feedback unit 112 has various methods for displaying items that are extracted in the Web page such as adding highlight, displaying in bold print, adding a frame, or displaying a list of items that are extracted in a separate window.

Methods by which the user corrects extraction rules include a method of using a mouse to click on the item that is to be extracted within the Web screen that is being displayed and a method of displaying a list of choices and selecting from among the list. When the extraction items have been corrected by the user's operation, extraction rule feedback unit 112 transmits new extraction rule 138 to AP interaction server 130.

AP interaction server 130 compares new extraction rule 138 with existing extraction rule 138 and corrects extraction rule 138. The process by which AP interaction server 130 corrects extraction rule 138 can be explained by the flow chart of FIG. 8. Here, the relaxation of conditions in the process of Step S133 shown in FIG. 8 is, for example, the addition of Formula 3 when Formula 1 shown hereinbelow is included in registered conversion rules 143 and Formula 2 is added by the user's instructions. In other words, the condition of "First" span tag described in Formula 1 is relaxed.

/html/body/span[1][class="foo"]/text( )  Formula 1

/html/body/span[2][class="foo"]/text( )  Formula 2

/html/body/span[class="foo"]/text( )  Formula 3

Here, when a multiplicity of span tags are contained within a body tag and these are not to be included among the extraction items, this relaxation is not executed because matching does not occur for the condition of Step S134. In addition, relaxation of conditions corresponds to designating "*" in place of a tag name to indicate any tag, and using "//" in place of "/" to take as targets all connoted tags without limitation to tags that are immediately inside.

Next, when pasting is instructed by the user's instructions, Web browser interaction processor 910 transmits URL 948 of the paste destination page to conversion rule selection unit 134. URL 948 of the paste destination page corresponds to paste-destination identifier 148 in the first exemplary embodiment. When the URL of the extraction source page and URL 948 of the paste destination page are not registered in conversion rule table 142, conversion rule selection unit 134 issues a request to Web browser interaction processor 910 for the structure information of the paste destination. A suitable example of the structure information when the paste destination is a Web page is the "form" tag and the "input" tag that is contained in the "form" tag. When the URL of the extraction source page and URL 948 of the paste destination page are not registered in conversion rule table 142, conversion rule selection unit 134 produces conversion rule 143 such that items that are to be pasted to each "input" tag are supplied.

Data conversion unit 135 creates paste candidate information 149 from extraction information 140 in accordance with conversion rule 143 that was selected. Paste candidate information 149 contains identifiers that indicate the "input" tags of the paste destinations and their value (candidates of one or more values may be further included) in a number equal to the number of "input" tags. Paste candidate information 149 may further include other candidates that share all "input" tags.

Data output unit 121 applies as input data that are candidates to each "input" tag based on paste candidate information 149. When there are other choices, the "input" tags may be replaced by a list box to allow the user to choose.

Paste feedback unit 122 uses constructions such as "onchange" in the page being displayed to monitor changes of the values of each "input" tag (or the substituted list box), and when a change has been implemented by the user, transmits correction information (paste feedback information 144) to AP interaction server 130. The monitoring of changes may employ the construction "onsubmit" such that input values are acquired immediately before being transmitted to the Web server.

In the present specific exemplary embodiment, an example of pasting was shown in which information is extracted from a Web page, but the same interaction process is possible for an AP that is operated by a client. In this case, the API (for example, WM_GETTEXT of Microsoft Windows (registered trademark)) that is the basic software that executes the AP can be used in the acquisition of information from the extraction-source AP. Alternatively, when the structure of the extraction source and paste destination is expressed by a tree-structure format, designation is possible by XPath as in the present specific exemplary embodiment, and when not expressed by tree structure, methods exist for designating by coordinate information.

An AP that cannot acquire operation of the extraction-source AP and paste-destination AP by the extraction-side interaction device and paste-side interaction device may be provided with means for displaying a transparent capture window over the target AP. This means is assumed to be included in extraction rule feedback unit 112 or paste feedback unit 122. This means can acquire correction operations of the user (carry out a process of monitoring operations) by transparently transmitting the same operations to the target AP while acquiring the operations to the capture window. In this method, arranging nontransparent elements on the capture window enables the highlight display of relevant portions for presenting extraction rules (a process for supporting input). Alternatively, displaying selection boxes on text input fields of the target AP enables the presentation of the input of selection choice format to the user (the implementation of a process for supporting input).

Figure 16:
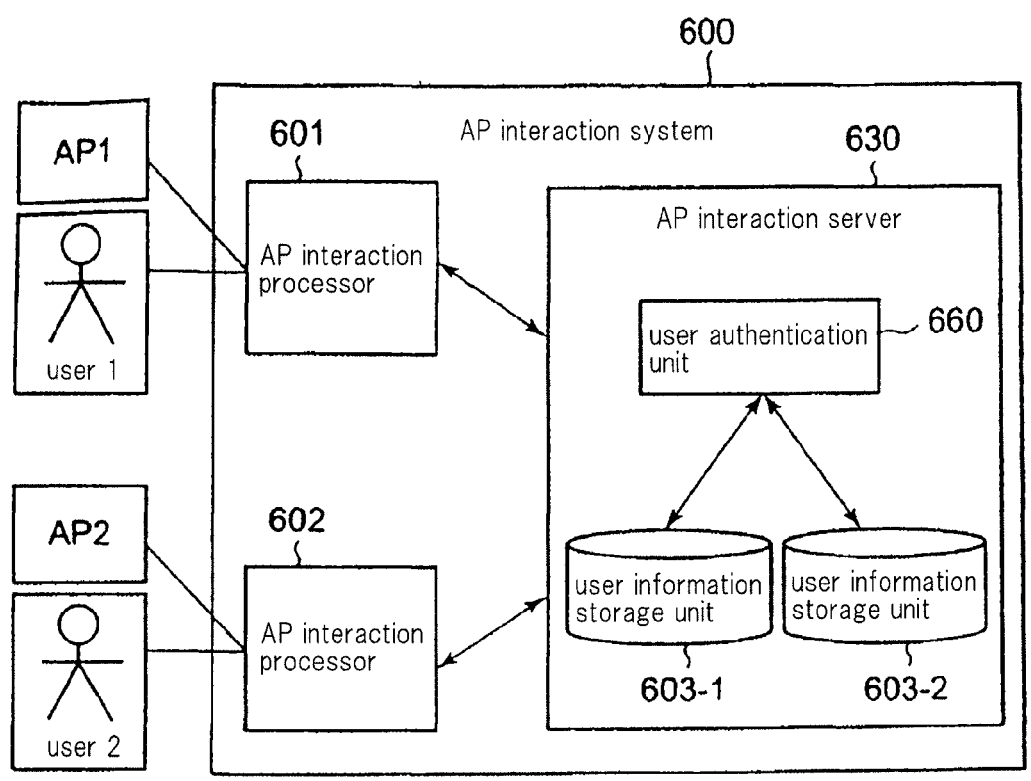
FIG. 16 is a block diagram showing the second working example of the AP interaction system according to the present invention.

A second specific exemplary embodiment is next explained. In the sixth exemplary embodiment, the use of the system according to the present invention enables the sharing of data for extraction/pasting among a plurality of users. FIG. 16 is a block diagram showing the second specific exemplary embodiment of the AP interaction system according to the present invention. AP interaction system 600 shown in FIG. 16 is provided with: AP interaction processor 601, AP interaction processor 602, and AP interaction server 630. AP interaction server 630 includes user authentication unit 660 and user information storage units 603-1 and 603-2.

User authentication unit 660 identifies and authenticates a user by means of an ID and password. As another example, user authentication unit 660 may be of a configuration for identifying and authenticating a user by means of a digital certificate.

When user 1, while working on AP 1, wishes to transfer the processing content on AP 1 to user 2, user 1 submits information extraction instructions to AP interaction processor 601. At this time, user 1 designates user 2 that is the presentation destination of the information. AP interaction processor 601 acquires the extraction-source information from AP 1 and transmits the information together with the ID and password of user 1 and the ID of user 2 as the presentation destination user to AP interaction server 630.

User authentication unit 660 of AP interaction server 630, upon authenticating that the information is from user 1, stores the information as extraction information in user information storage unit 603-1 in which information for user 1 is stored, and attaches a code that permits access from user 2 that is the presentation destination.

User 1 next reports to user 2 by another means (for example, communication by oral communication or by mail) that preparations have been completed, whereupon user 2 gives instructions for pasting to AP interaction processor 602. AP interaction processor 602 transmits to AP interaction server 630 the paste-destination identifier of AP 2 together with the ID and password of user 2 and the ID of user 1 that is the presentation source.

User authentication unit 660 of AP interaction server 630 confirms that the request is from user 2 and confirms that a code permitting access from user 2 is appended to the extraction information stored in user information storage unit 603-1 of user 1. User authentication unit 660 then, in accordance with conversion rules 143 stored in user information storage unit 603-2 or conversion rule storage unit 141, converts the extraction information stored in user information storage unit 603-1 and transmits paste candidate information to AP interaction processor 602. AP interaction processor 602 supplies items corresponding to the paste candidate information to AP 2.

Although a case has been described in this specific exemplary embodiment in which extraction information that is delivered is stored in a user information storage unit of the presentation source, a configuration is also possible in which the extraction information is stored in the user information storage unit of the presentation destination. In such a case, permission for user 1 to place extraction information in the user information storage unit of user 2 must be established beforehand. Alternatively, a configuration is possible in which a reception-only information storage unit is provided for each user and information from other users is then accepted in the reception-only information storage unit.

The extraction of data from an application includes the extraction of data that are in some cases created or in some cases acquired by an application program (more specifically, data that are created or acquired by a CPU that operates according to an application program such as a tabulation program or a browser). The pasting of data to an application includes the insertion of extracted data into data that are in some cases created and in some cases acquired by an application program and the overwriting of data that are in some cases created and in some cases acquired by an application program by extracted data.

In the above-described exemplary embodiments, extraction rules may be placed in correspondence with extraction-source identifiers that indicate the application that is the data extraction source, and the extraction rule selection means, upon receiving a request to extract data from the first application, may select an extraction rule that corresponds to the extraction-source identifier that matches an extraction-source identifier that indicates the first application, and when an extraction rule that corresponds to the extraction-source identifier that matches the extraction-source identifier that indicates the first application is not stored in the extraction rule storage means, the extraction rule selection means may select the extraction rule that corresponds to the extraction-source identifier that is most similar to the extraction-source identifier that indicates the first application. This type of configuration enables the output of data identification information that corresponds to an extraction-source identifier that matches or that is the most similar.

In the above-described exemplary embodiments, the extraction-source identifiers may be URI, the extraction rule selection means may partition the URI by punctuation characters and, taking each partitioned part as an element, may determine the degree of similarity based on the degree to which elements match. According to this type of configuration, matching or similar extraction-source identifiers can be selected based on the degree to which URI match.

In the above-described exemplary embodiments, conversion rules may be placed in correspondence with extraction-source identifiers that indicate the application that is the extraction source of data and paste-destination identifiers that indicate the application that is the paste destination of data; and the conversion rule selection means, upon receiving a request to paste data to a second application, may select a conversion rule that corresponds to the paste-destination identifier that matches a paste-destination identifier that indicates the second application; and when a conversion rule that corresponds to a paste-destination identifier that matches the paste-destination identifier that indicates the second application is not stored in the conversion rule storage means, or when a conversion rule that corresponds to the extraction-source identifier that matches the extraction-source identifier that indicates the first application is not stored in the conversion rule storage means, the conversion rule selection means may select the conversion rule that corresponds to the extraction-source identifier that most resembles the extraction-source identifier that indicates the first application. This configuration enables the output of a conversion rule that corresponds to the matching or most similar extraction-source identifier and paste-destination identifier.

In the above-described exemplary embodiments, the paste-destination identifier may be a URI, and the conversion rule selection means may partition URI by punctuation characters, and taking each of the partitioned parts as elements, determine the degree of similarity based on the degree to which elements match. This configuration enables the selection of matching or similar paste-destination identifiers based on the degree to which the URIs match.

In the above-described exemplary embodiments, extraction rule generalization means may be provided for lumping together extraction rules, which correspond to each of a plurality of extraction-source identifiers in which parts match, into a single extraction rule that contains a common extraction-source identifier that can specify each of a plurality of extraction-source identifiers. This type of configuration can reduce the amount of information that is stored in the extraction rule storage means.

In the above-described exemplary embodiments, extraction rule integration means may be provided for, when there is a plurality of extraction rules in which the information that can specify data that are extracted is the same, placing the extraction-source identifiers that correspond to each of these extraction rules in correspondence with one extraction rule.

This type of configuration enables a reduction of the amount of information that is stored in the extraction rule storage means.

In the above-described exemplary embodiments, conversion rule generalization means may be provided for lumping together a plurality of conversion rules, in which a portion of information that is placed in correspondence with the conversion rules and the content of conversion rules matches, into a single conversion rule. A configuration of this type enables a reduction of the amount of information that is stored in the conversion rule storage means.

In the above-described exemplary embodiments, conversion rule integration means may be provided for, when there is a plurality of conversion rules in which information that can specify paste position is identical, placing the extraction-source identifiers and paste-destination identifiers that correspond to each of these conversion rules in correspondence with a single conversion rule. A configuration of this type can reduce the amount of information that is stored in the conversion rule storage means.

In the above-described exemplary embodiments, an extraction rule following alteration may be received as input from extraction rule feedback means, the extraction rule after alteration may be compared with the extraction rule before alteration, the extraction rule before alteration may be relaxed when the amount of alteration is no greater than a prescribed value, and the extraction rule following relaxation may be stored in extraction information storage means when the number of data items that are extracted according to the extraction rule after relaxation is no greater than a prescribed value. This type of configuration enables a reduction of the amount of information that is stored in the extraction information storage means.

In the above-described exemplary embodiments, the extraction rule feedback means may arrange a transparent window on the first application and may execute either of or both of process for supporting input to the first application and a process for monitoring the operations upon the first application. This type of configuration enables the transmission of the same operations to applications while acquiring operations upon the window.

In the above-described exemplary embodiments, the paste feedback means may arrange a transparent window on the target application and execute either of or both of process for supporting input to the second application and a process for monitoring operations upon the second application. This type of configuration enables transmission of the same operations to applications while acquiring operations upon the window.

In the above-described exemplary embodiments, the extraction rules may be placed in correspondence with extraction-source identifiers that indicate the application that is the extraction source of data, and the extraction rule selection means, upon receiving a request to extract data from the first application, may select an extraction rule that corresponds to an extraction-source identifier that matches an extraction-source identifier that indicates the first application, and when an extraction rules that corresponds to an extraction-source identifier that matches an extraction-source identifier that indicates the first application is not stored in the extraction rule storage means, may select an extraction rule that corresponds to an extraction-source identifier that most resembles an extraction-source identifier that indicates the first application. This type of configuration enables output of data identification information that corresponds to a matching or similar extraction-source identifier.

In the above-described exemplary embodiments, the extraction-source identifier may be a URI, and the extraction rule selection means may partition the URI by punctuation characters and, taking each partitioned part as an element, determine the degree of similarity based on the degree to which elements match. This type of configuration enables the selection of matching or similar extraction-source identifiers based on the degree to which the URIs match.

In the above-described exemplary embodiments, conversion rules may be placed in correspondence with extraction-source identifiers that indicate the application that is the extraction source of data and paste-destination identifiers that indicate the application that is the paste destination of data, and the conversion rule selection means, upon receiving a request to paste data to the second application, may select a conversion rule that corresponds to a paste-destination identifier that matches a paste-destination identifier that indicates the second application, and when a conversion rule that corresponds to a paste-destination identifier that matches a paste-destination identifier that indicates the second application is not stored in the conversion rule storage means, or when a conversion rule that corresponds to an extraction-source identifier that matches an extraction-source identifier that indicates the first application is not stored in the conversion rule storage means, may select the conversion rule that corresponds to the extraction-source identifier that most resembles the extraction-source identifier that indicates the first application. This type of configuration enables the output of a conversion rule that corresponds to a matching or similar extraction-source identifier and paste-destination identifier.

In the above-described exemplary embodiments, the paste-destination identifiers may be a URI, and the conversion rule selection means may partition a URI by punctuation characters and, taking the partitioned parts as elements, determine the degree of similarity based on the degree to which elements match. This type of configuration enables the selection of matching or similar paste-destination identifiers based on the degree to which the URIs match.

In the above-described exemplary embodiments, extraction rule generalization means may be provided for lumping together extraction rules that correspond to each of a plurality of extraction-source identifiers in which portions concur into a single extraction rule that includes a common extraction-source identifier that can specify each of a plurality of extraction-source identifiers. This type of configuration enables a reduction of the amount of information that is stored in the extraction rule storage means.

In the above-described exemplary embodiments, extraction rule integration means may be provided for, when there is a plurality of extraction rules in which information that can specify data that are to be extracted is the same, placing the extraction-source identifiers that correspond to each of these extraction rules in correspondence with a single extraction rule. This type of configuration enables a reduction of the amount of information that is stored in the extraction rule storage means.

In the above-described exemplary embodiments, conversion rule generalization means may be provided for lumping together in one conversion rule a plurality of conversion rules in which a portion of the information that is placed in correspondence with conversion rules and the content of conversion rules match. This type of configuration enables a reduction of the amount of information that is stored in the conversion rule storage means.

In the above-described exemplary embodiments, conversion rule integration means may be provided for, when there is a plurality of conversion rules in which information that can specify paste position is identical, placing the extraction-source identifier and paste-destination identifier that correspond to each of these conversion rules in correspondence with a single conversion rule. A configuration of this type enables a reduction of the amount of information that is stored in the conversion rule storage means.

In the above-described exemplary embodiments, an extraction rule following alteration may be received as input from extraction rule feedback means, the extraction rule after alteration may be compared with the extraction rule before alteration, the extraction rule before alteration may be relaxed if the amount of alteration is no greater than a prescribed value, and when the number of data items extracted according to the extraction rule after relaxation is no greater than a prescribed value, the extraction rule after relaxation may be stored in the extraction information storage means. A configuration of this type enables a reduction of the amount of information that is stored in the extraction information storage means.

In the above-described exemplary embodiments, the extraction rule feedback means may arrange a transparent window on the first application and may execute either of or both a process for supporting input to the first application and a process for monitoring operations upon the first application. A configuration of this type enables the transmission of the same operations to applications while acquiring operations upon windows.

In the above-described exemplary embodiments, the paste feedback means may arrange a transparent window on a target application and may execute either of or both a process of supporting input to the second application and a process of monitoring operations upon the second application. A configuration of this type enables the transmission of identical operations to applications while acquiring operations upon windows.

In the above-described exemplary embodiments, extraction rules may be placed in correspondence with extraction-source identifiers that indicate the application that is the extraction source of data, and in an extraction rule selection process, a computer may be caused to execute processes of, upon receiving a request to extract data from a first application, selecting an extraction rule that corresponds to an extraction-source identifier that matches an extraction-source identifier that indicates the first application, and when an extraction rule that corresponds to an extraction-source identifier that matches an extraction-source identifier that indicates the first application is not stored in the extraction rule storage means, selecting an extraction rule that corresponds to the extraction-source identifier that is most similar to the extraction-source identifier that indicates the first application. A configuration of this type enables the output of data identification information that corresponds to a matching or similar extraction-source identifier.

In the above-described exemplary embodiments, the extraction-source identifiers may be a URI, and in an extraction rule selection process, a computer may be caused to execute a process of partitioning a URI by punctuation characters and, taking each of these partitioned parts as elements, determining the degree of similarity based on the degree to which elements match. A configuration of this type enables the selection of matching or similar extraction-source identifiers based on the degree to which the URIs match.

In the above-described exemplary embodiments, the conversion rules may be placed in correspondence with extraction-source identifiers that indicate the application that is the extraction source of data and paste-destination identifiers that indicate the application that is the paste destination of data, and in a conversion rule selection process, a computer may be caused to execute processes of, upon receiving a request to paste data to the second application, selecting the conversion rule that corresponds to a paste-destination identifier that matches a paste-destination identifier that indicates the second application, and when a conversion rule that corresponds to a paste-destination identifier that matches a paste-destination identifier that indicates the second application is not stored in the conversion rule storage means, or when a conversion rule that corresponds to an extraction-source identifier that matches an extraction-source identifier that indicates the first application is not stored in the conversion rule storage means, selecting the conversion rule that corresponds to the extraction-source identifier that is most similar to an extraction-source identifier that indicates the first application. A configuration of this type enables output of a conversion rule that corresponds to a matching or similar extraction-source identifier and paste-destination identifier.

In the above-described exemplary embodiments, the paste-destination identifiers may be a URI, and, in a conversion rule selection process, a computer may be caused to execute processes of partitioning a URI by punctuation characters and, taking each of the partitioned parts as elements, determining the degree of similarity based on the degree to which elements match. A configuration of this type enables the selection of matching or similar paste-destination identifiers based on the degree to which the URIs match.

In the above-described exemplary embodiments, a computer may be caused to execute an extraction rule generalization process of lumping together extraction rules that correspond to each of a plurality of extraction-source identifiers in which parts concur into a single extraction rule that contains a common extraction-source identifier that can specify each of the plurality of extraction-source identifiers. A configuration of this type enables a reduction of the amount of information that is stored in the extraction rule storage means.

In the above-described exemplary embodiments, a computer may be caused to execute an extraction rule integration process of, when there is a plurality of extraction rules in which information that can specify data that are to be extracted is identical, placing the extraction-source identifiers that correspond to each of these extraction rules in correspondence with a single extraction rule. A configuration of this type enables a reduction of the amount of information that is stored in the extraction rule storage means.

In the above-described exemplary embodiments, a computer may be caused to execute a conversion rule generalization process of combining into a single conversion rule a plurality of conversion rules in which a portion of the information that is placed in correspondence with the conversion rules and the content of conversion rules match. A configuration of this type enables a reduction of the amount of information that is stored in the conversion rule storage means.

In the above-described exemplary embodiments, a computer may be caused to execute a conversion rule integration process of, when there is a plurality of conversion rules in which information that can specify paste position is identical, placing extraction-source identifiers and paste-destination identifiers that correspond to each of these conversion rules in correspondence with a single conversion rule. A configuration of this type enables a reduction of the amount of information that is stored in the conversion rule storage means.

In the above-described exemplary embodiments, a computer may be caused to, in an extraction rule feedback process, receive as input an extraction rule following alteration, compare the extraction rule following alteration with the extraction rule before alteration, relax the extraction rule before alteration when the amount of alteration is no greater than a prescribed value, and when the number of data items that are extracted in accordance with the extraction rule following relaxation is no greater than a prescribed value, storing the extraction rule following relaxation in extraction information storage means. A configuration of this type enables a reduction of the amount of information that is stored in the extraction rule storage means.

In the above-described exemplary embodiments, a computer may be caused to, in an extraction rule feedback process, arrange a transparent window on a first application and execute either of or both a process of supporting input to the first application and a process of monitoring operations upon the first application. A configuration of this type enables the transmission of identical operations to applications while acquiring operations upon a window.

In the above-described exemplary embodiments, a computer may be caused to, in a paste feedback process, arrange a transparent window on a target application and execute either or both of a process of supporting input to a second application and a process of monitoring operations upon the second application. A configuration of this type enables transmission of identical operations to applications while acquiring operations to a window.

A preferable exemplary embodiment of the AP interaction system according to the present invention is made up of one or more extraction-side interaction devices, one or more paste-side interaction devices, and an AP interaction server. The extraction-side interaction device is provided with: an information acquisition unit for acquiring information from an extraction-source AP in accordance with the user's instructions and transferring the information to the AP interaction server; and extraction item feedback unit for presenting to the user extraction items acquired from the AP interaction server and, when an extraction item that was presented is corrected by the user's operations, returning the extraction item that was corrected to the AP interaction server.

A preferable exemplary embodiment of the paste-side interaction device according to the present invention is provided with: a data output unit for transferring to the AP interaction server an identifier that indicates a paste-destination AP, acquiring paste candidate information from the AP interaction server, and supplying paste candidate information to each input unit (corresponding to the paste site) of the paste-destination AP; and a paste information feedback unit for, when the values of the input units of the paste-destination AP are corrected to other paste candidates by the user's operations or to values applied as input by the user, reporting the correction content as paste feedback information to the AP interaction server. In an example of a suitable configuration of a paste candidate, this paste feedback information is expressed as sets of paste positions, pasted values, and other candidates of pasted values specified by language that designates items in tree-structure data.

A preferable exemplary embodiment of the AP interaction server according to the present invention is provided with: an extraction rule selection unit; an information extraction unit; a conversion rule selection unit for determining conversion rules that are used from extraction-source identifiers and paste-destination identifiers of extraction information that is stored; a data conversion unit for converting extraction information in accordance with conversion rules; an extraction rule storage unit for storing extraction rules and an extraction rule table; an extraction information storage unit for storing extraction information; a conversion rule storage unit for storing a conversion rule table, conversion rules, and feedback examples; and a feedback reflection unit for updating conversion rules from feedback information.

The AP interaction system according to the present exemplary embodiment that is configured as described above operates as described hereinbelow. First, when extracting information according to extraction instructions from the user, the information acquisition unit transmits all information that can be acquired from the extraction-source AP as extraction-source information together with an extraction-source identifier to the AP interaction server.

The extraction rule selection unit searches for the extraction-source identifier from the extraction rule table and returns the extraction rule that is recorded to the extraction-side interaction device. If the extraction-source identifier is not registered in the extraction rule table, the extraction rule selection unit selects, as the initial extraction rule, the extraction rule for which the extraction-source identifier is most similar from among the extraction-source identifiers that are registered in the extraction rule table and records the extraction rule in the extraction rule table. The extraction rule selection unit next saves in the extraction information storage unit the extraction-source information and the extraction information for information that was extracted in accordance with the selected extraction rule based on the extraction-source information.

The extraction item feedback unit that has received the extraction items presents the extraction items to the user by way of the extraction-source AP. When the user gives instructions for the correction of the extraction items, the extraction item feedback unit transmits the extraction items that were corrected as extraction item feedback information to the AP interaction server. The information extraction unit, having received the extraction item feedback information, again extracts information from the extraction-source information that is saved in the extraction information storage unit in accordance with the new extraction items and saves the information in the extraction information storage unit. In addition, the information extraction unit compares the extraction items following correction and before correction and corrects the extraction rule table and extraction items that are saved in the extraction rule storage unit.

Next, at the time of information pasting in accordance with paste instructions from the user, the paste-side interaction device transmits a paste-destination identifier to the AP interaction server, and the conversion rule selection unit, having received the paste-destination identifier, searches for the extraction-source identifier of the extraction information that is stored in the extraction information storage unit and the paste-destination identifier from the conversion rule table. When the paste-destination identifier is not registered in the conversion rule table, the conversion rule selection unit issues a request to the paste-side interaction device for structure information of the data that the paste-destination AP is to receive, and selects, from among the conversion rules that are registered in the conversion rule table, the conversion rule whose paste-destination AP structure information and extraction-source identifier are most similar.

Next, the data conversion unit converts the extraction information that is stored in the extraction information storage unit according to the conversion rule that was selected and transmits the result as paste candidate information to the paste-side interaction device. The paste candidate information may include one or more choices other than the candidate that is first presented to the user. The data output unit, having received the paste candidate information, supplies the paste candidate information to each input unit of the paste-destination AP. When other choices are included in the paste candidate information, the data output unit may present the choices such that the user can selectively choose. The paste feedback unit monitors the user's correction operations (or operations for selecting other choices), and when the paste candidate information is corrected, transmits to the AP interaction server as paste feedback information that indicates which candidates were corrected and the manner of correction (or which choices were selected). The AP interaction server stores the paste feedback information as feedback examples. The feedback reflection unit corrects conversion rule in accordance with the feedback examples such that the values corrected by the user are supplied.

By adopting the above-described configuration, the interaction procedure can be corrected by correcting the values on the AP that are the result rather than the extraction rules or conversion rules and without again carrying out the registration operation of the interaction procedure, even when the target AP has been altered. This correction can be realized because the AP interaction system according to the present invention is provided with an extraction item feedback unit, and when an extraction item is corrected by the user's operations, operates such that the extraction rules are corrected. In addition, the AP interaction system according to the present invention is further provided with a paste feedback unit and a feedback reflection unit, and when a pasted item is corrected by the user's operations, operates such that the conversion rules are corrected.

In addition, when implementing interaction of a new AP pair, assistance to the user is carried out for the interaction whereby the interaction procedure can be set based on the user's operations on the AP. This can be realized because the AP interaction system of the present invention stores extraction rules and conversion rules, and when interacting with a new extraction-source AP, presents the extraction rules that are most similar to the user and creates correct extraction rules through correction by the user of only the incorrect sites of the extraction rules that are presented. In addition, this interaction can be realized because, when interaction is carried out between an AP pair that is not registered, conversion rules of the extraction source and paste destination that are most similar are used and correct conversion rules are created by the user's correction operations.

Utility in Industry

The above-described exemplary embodiments can be used for such purposes as user-led interaction support tools between a plurality of Web applications and business applications. The above-described exemplary embodiments can further be used for purposes such as an information exchange system for exchanging information among a plurality of computers or portable information terminals. The above-described exemplary embodiments can further be used for purposes such as a tool for improving business efficiency and that stores the operations of an expert and that supports the operations of a novice.

What is claimed is:

1. An application interaction system for executing processes for extracting data from a first application in accordance with an extraction rule that includes information that can specify data that are to be extracted and, in accordance with a conversion rule that includes information that can specify a paste position, pasting to a second application data that have been extracted from said first application, said application interaction system comprising:
    an extraction rule storage unit storing said extraction rules;
    a conversion rule storage unit storing said conversion rules;
    an extraction rule selection unit selecting an extraction rule that is stored in said extraction rule storage unit in accordance with a request to extract data;
    an information extraction unit extracting data from said first application in accordance with the extraction rule that was selected by said extraction rule selection unit;
    a conversion rule selection unit selecting a conversion rule that is stored in said conversion rule storage unit in accordance with a request to paste data; and
    a data output unit supplying, in accordance with the conversion rule that was selected by said conversion rule selection unit, data that were extracted by said information extraction unit in order to paste the data that were extracted in said second application;
    said application interaction system further comprising:
    either one or both of: an extraction rule feedback unit presenting to said first application an extraction rule that was selected by said extraction rule selection unit and which supplies an extraction rule following alteration in accordance with data alteration instructions that are specified by the extraction rule that was presented and a paste feedback unit supplying information indicating a content of alteration according to instructions to alter data supplied by said data output unit.

2. The application interaction system according to claim 1, wherein:
    said extraction rules are placed in correspondence with extraction-source identifiers that indicate the application that is the extraction source of data; and
    said extraction rule selection unit, upon receiving a request to extract data from said first application, selects an extraction rule that corresponds to an extraction-source identifier that matches an extraction-source identifier that indicates said first application and, when an extraction rule that corresponds to an extraction-source identifier that matches an extraction-source identifier that indicates said first application is not stored in said extraction rule storage unit, selects an extraction rule that corresponds to the extraction-source identifier that is most similar to an extraction-source identifier that indicates said first application.

3. The application interaction system according to claim 2, wherein:
    said extraction-source identifiers are URIs; and
    said extraction rule selection unit partitions URIs by punctuation characters and, taking each partitioned part as an element, determines degree of similarity based on the degree to which elements match.

4. The application interaction system according to claim 2, further provided with an extraction rule generalization unit combining together said extraction rules, which correspond to each of a plurality of said extraction-source identifiers in which parts coincide, into a single extraction rule that includes a common extraction-source identifier that can specify each of said plurality of extraction-source identifiers.

5. The application interaction system according to claim 2, further provided with an extraction rule integration unit placing, when there is a plurality of said extraction rules in which information that can specify data to be extracted is identical, extraction-source identifiers that correspond to each of these extraction rules in correspondence with a single extraction rule.

6. The application interaction system according to claim 1, wherein:
    said conversion rules are placed in correspondence with extraction-source identifiers that indicate the application that is the extraction source of data and paste-destination identifiers that indicate the application that is the paste destination of data; and said conversion rule selection unit, upon receiving a request to paste data to said second application, selects a conversion rule that corresponds to a paste-destination identifier that matches a paste-destination identifier that indicates said second application, and when a conversion rule that corresponds to a paste-destination identifier that matches a paste-destination identifier that indicates said second application is not stored in said conversion rule storage unit, or when a conversion rule that corresponds to an extraction-source identifier that matches an extraction-source identifier that indicates said first application is not stored in said conversion rule storage unit, selects a conversion rule that corresponds to the extraction-source identifier that is most similar to an extraction-source identifier that indicates said first application.

7. The application interaction system according to claim 6, wherein:
said paste-destination identifiers are URIs; and
said conversion rule selection unit partitions URIs by punctuation characters and, taking each partitioned part as an element, determines degree of similarity based on the degree to which elements match.

8. The application interaction system according to claim 6, further provided with a conversion rule generalization unit combining together a plurality of said conversion rules, in which a portion of the content of said conversion rules and information placed in correspondence with said conversion rules match, into a single conversion rule.

9. The application interaction system according to claim 6, further provided with a conversion rule integration unit placing, when there is a plurality of said conversion rules in which information that can specify said paste position is identical, extraction-source identifiers and paste-destination identifiers that correspond to each of these conversion rules in correspondence with a single conversion rule.

10. The application interaction system according to claim 1, wherein:
extraction rules following alteration are received as input from said extraction rule feedback unit;
extraction rules following alteration are compared with extraction rules before alteration;
extraction rules before alteration are relaxed if the amount of alteration is no greater than a prescribed value; and
when the number of data items that are extracted in accordance with an extraction rule following relaxation is no greater than prescribed value, the extraction rules after relaxation are stored in said extraction information storage unit.

11. The application interaction system according to claim 1, wherein said extraction rule feedback unit arranges a transparent window on said first application and executes either one or both of:
a process of supporting input to said first application, and
a process of monitoring operations upon said first application.

12. The application interaction system according to claim 1, wherein said paste feedback unit arranges a transparent window on a target application and executes either one or both of:
a process of supporting input to said second application and
a process of monitoring operations upon said second application.

13. An application interaction method for extracting data from a first application in accordance with an extraction rule that includes information that can specify data that are to be extracted and, in accordance with a conversion rule that includes information that can specify a paste position, pasting to a second application data that were extracted from said first application, said application interaction method comprising:
selecting an extraction rule that is stored in an extraction rule storage unit in accordance with a data extraction request;
extracting data from said first application in accordance with said extraction rule that was selected;
selecting a conversion rule that is stored in a conversion rule storage unit in accordance with a data paste request;
in accordance with said conversion rule that was selected, supplying said data that were extracted for pasting in said second application; and
either presenting said extraction rule that was selected to said first application and supplying an extraction rule following alteration in accordance with data alteration instructions that are specified by the extraction rule that was presented or supplying information indicating altered content according to said data alteration instructions that were supplied, or alternatively, both presenting said extraction rule that was selected to said first application and supplying an extraction rule that follows alteration according to data alteration instructions that are specified by the extraction rules that was presented, and further, supplying information indicating altered content according to said data alteration instructions that were supplied.

14. A non-transitory computer-readable recording medium for storing an application interaction program that is installed in a computer for executing processes for extracting data from a first application in accordance with an extraction rule that includes information that can specify data that are to be extracted and for, in accordance with a conversion rule that includes information that can specify a paste position, pasting to a second application data that were extracted from said first application; said application interaction program causing said computer to execute:
an extraction rule selection process of selecting an extraction rule that is stored in an extraction rule storage unit in accordance with a data extraction request;
an information extraction process of extracting data from said first application in accordance with an extraction rule that was selected in said extraction rule selection process;
a conversion rule selection process of selecting a conversion rule that is stored in a conversion rule storage unit in accordance with a data paste request; and
a data output process of, in accordance with a conversion rule that was selected in said conversion rule selection process, supplying data that were extracted in said information extraction process for pasting to said second application; and further,
causing said computer to execute either an extraction rule feedback process of presenting to said first application an extraction rule that was selected in said extraction rule selection process and supplying the extraction rule following alteration according to data alteration instructions that are specified by the extraction rule that was presented or a paste feedback process of supplying information indicating altered content according to data alteration instructions that were supplied in said data output process, or alternatively, for causing said computer to execute both said extraction rule feedback process and said paste feedback process.

15. The non-transitory computer-readable recording medium according to claim 14, wherein:
said extraction rules are placed in correspond with extraction-source identifiers that indicate the application that is the extraction source of data; and
said computer is caused to execute a process of, in said extraction rule selection process, upon receiving a request to extract data from said first application, selecting an extraction rule that corresponds to an extraction-source identifier that matches an extraction-source identifier that indicates said first application and, when an extraction rule that corresponds to an extraction-source identifier that matches an extraction-source identifier that indicates said first application is not stored in said extraction rule storage unit, selecting an extraction rule that corresponds to the extraction-source identifier that is most similar to an extraction-source identifier that indicates said first application.

16. The non-transitory computer-readable recording medium according to claim 15, wherein:
said extraction-source identifiers are URIs; and
said computer is caused to execute a process of, in said extraction rule selection process, partitioning URIs by punctuation characters and, taking each partitioned part as an element, determining degree of similarity based on the degree to which elements match.

17. The non-transitory computer-readable recording medium according to claim 15, for causing said computer to execute an extraction rule generalization process of combining together said extraction rules, which correspond to each of a plurality of said extraction-source identifiers in which parts coincide, into a single extraction rule that includes a common extraction-source identifier that can specify each of said plurality of extraction-source identifiers.

18. The non-transitory computer-readable recording medium according to claim 15, for causing said computer to execute an extraction rule integration process of, when there is a plurality of said extraction rules in which information that can specify data to be extracted is identical, placing extraction-source identifiers that correspond to each of these extraction rules in correspondence with a single extraction rule.

19. The non-transitory computer-readable recording medium according to claim 14, wherein:
said conversion rules are placed in correspondence with extraction-source identifiers that indicate the application that is the extraction source of data and paste-destination identifiers that indicate the application that is the paste destination of data; and
said computer is caused to execute a process of, in said conversion rule selection process, upon receiving a request to paste data to said second application, selecting a conversion rule that corresponds to a paste-destination identifier that matches a paste-destination identifier that indicates said second application, and when a conversion rule that corresponds to a paste-destination identifier that matches a paste-destination identifier that indicates said second application is not stored in said conversion rule storage unit, or when a conversion rule that corresponds to an extraction-source identifier that matches an extraction-source identifier that indicates said first application is not stored in said conversion rule storage unit, selecting a conversion rule that corresponds to the extraction-source identifier that is most similar to an extraction-source identifier that indicates said first application.

20. The non-transitory computer-readable recording medium according to claim 19, wherein:
said paste-destination identifiers are URIs; and
said computer is caused to execute a process of, in said conversion rule selection process, partitioning URIs by punctuation characters and, taking each partitioned part as an element, determining degree of similarity based on the degree to which elements match.

21. The non-transitory computer-readable recording medium according to claim 19 for causing said computer to execute a conversion rule generalization process of combining together a plurality of said conversion rules, in which a portion of the content of said conversion rules and information placed in correspondence with said conversion rules match, into a single conversion rule.

22. The computer-readable recording medium according to claim 19, for causing said computer to execute a conversion rule integration process of, when there is a plurality of said conversion rules in which information that can specify said paste position is identical, placing extraction-source identifiers and paste-destination identifiers that correspond to each of these conversion rules in correspondence with a single conversion rule.

23. The non-transitory computer-readable recording medium according to claim 14, for causing said computer:
to receive as input extraction rules following alteration in said extraction rule feedback process;
to compare extraction rules following alteration with extraction rules before alteration;
to relax extraction rules before alteration if the amount of alteration is no greater than a prescribed value; and
when the number of data items that are extracted in accordance with an extraction rule following relaxation is no greater than prescribed value, to store the extraction rules after relaxation in said extraction information storage unit.

24. The non-transitory computer-readable recording medium according to claim 14, for causing said computer to, in said extraction rule feedback process, arrange a transparent window on said first application and execute either one or both of:
a process of supporting input to said first application, and
a process of monitoring operations upon said first application.

25. An application interaction system for executing processes for extracting data from a first application in accordance with an extraction rule that includes information that can specify data that are to be extracted and, in accordance with a conversion rule that includes information that can specify a paste position, pasting to a second application data that have been extracted from said first application, said application interaction system comprising:
extraction rule storage means for storing said extraction rules;
conversion rule storage means for storing said conversion rules;
extraction rule selection means for selecting an extraction rule that is stored in said extraction rule storage means in accordance with a request to extract data;
information extraction means for extracting data from said first application in accordance with the extraction rule that was selected by said extraction rule selection means;
conversion rule selection means for selecting a conversion rule that is stored in said conversion rule storage means in accordance with a request to paste data; and
data output means for, in accordance with the conversion rule that was selected by said conversion rule selection means, supplying data that were extracted by said information extraction means for pasting in said second application;
said application interaction system further comprising:
either one or both of: extraction rule feedback means for presenting to said first application an extraction rule that was selected by said extraction rule selection means and supplying an extraction rule following alteration in accordance with data alteration instructions that are specified by the extraction rule that was presented and paste feedback means for supplying information indicating a content of alteration according to instructions to alter data supplied by said data output means.

* * * * *